(12) United States Patent
Conley et al.

(10) Patent No.: US 10,496,065 B2
(45) Date of Patent: Dec. 3, 2019

(54) SYSTEMS AND METHODS FOR MOBILE APPLICATION FOR HVAC INSTALLATION AND DIAGNOSTICS

(71) Applicant: EMERSON ELECTRIC CO., St. Louis, MO (US)

(72) Inventors: Justin Dean Conley, O'Fallon, IL (US); Julie Ann Harpring, St. Louis, MO (US); Jeffrey N. Arensmeier, Fenton, MO (US); Paul Layton, Brentwood, MO (US); Scott Valentine, St. Louis, MO (US); Thomas Ryan Koby, O'Fallon, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 47 days.

(21) Appl. No.: 15/483,449

(22) Filed: Apr. 10, 2017

(65) Prior Publication Data
US 2017/0292725 A1    Oct. 12, 2017

Related U.S. Application Data

(60) Provisional application No. 62/320,947, filed on Apr. 11, 2016.

(51) Int. Cl.
*G05B 19/048*    (2006.01)

(52) U.S. Cl.
CPC .... *G05B 19/048* (2013.01); *G05B 2219/2614* (2013.01)

(58) Field of Classification Search
CPC .. F24F 11/30; F24F 11/32; F24F 11/39; F24F 11/46; F24F 11/57; F24F 11/62; F24F 11/70; F24F 2110/00; F24F 2110/10; F24F 2140/60; G05B 19/048; G05B 2219/2614

See application file for complete search history.

(56) References Cited

U.S. PATENT DOCUMENTS

| 6,324,854 B1 | 12/2001 | Jayanth | |
| 9,785,902 B1* | 10/2017 | Fontaine | ............ G06Q 10/0635 |
| 2013/0158715 A1* | 6/2013 | Barton | ............... G05D 23/1902 700/276 |

(Continued)

*Primary Examiner* — Yuhui R Pan
(74) *Attorney, Agent, or Firm* — Harness, Dickey & Pierce, P.L.C.

(57) ABSTRACT

A monitoring system for monitoring a heating, ventilation, and air conditioning (HVAC) system of a building is provided. The monitoring system includes a monitoring server and a monitoring client. The monitoring server is configured to receive an aggregate current value from a monitoring device, wherein the aggregate current value represents a total current flowing through the HVAC system, determine a commanded operating mode of the HVAC system in response to the aggregate current value, wherein operating modes of the HVAC system include at least one of an idle mode and an ON mode, and analyze a system condition of the HVAC system based on the determined commanded operating mode. The monitoring client is configured to command the monitoring server to execute validation testing based on data received from monitoring the HVAC system, display results of validation testing, display real-time system performance data, and display an alert during a system malfunction.

16 Claims, 28 Drawing Sheets

(56) References Cited

U.S. PATENT DOCUMENTS

| | | | |
|---|---|---|---|
| 2014/0200718 A1* | 7/2014 | Tessier | G05D 23/1902 700/276 |
| 2014/0214212 A1* | 7/2014 | Leen | G05D 23/1902 700/276 |
| 2014/0262134 A1* | 9/2014 | Arensmeier | F24F 11/02 165/11.2 |
| 2014/0278681 A1* | 9/2014 | Cox | G06Q 30/0641 705/7.19 |

* cited by examiner

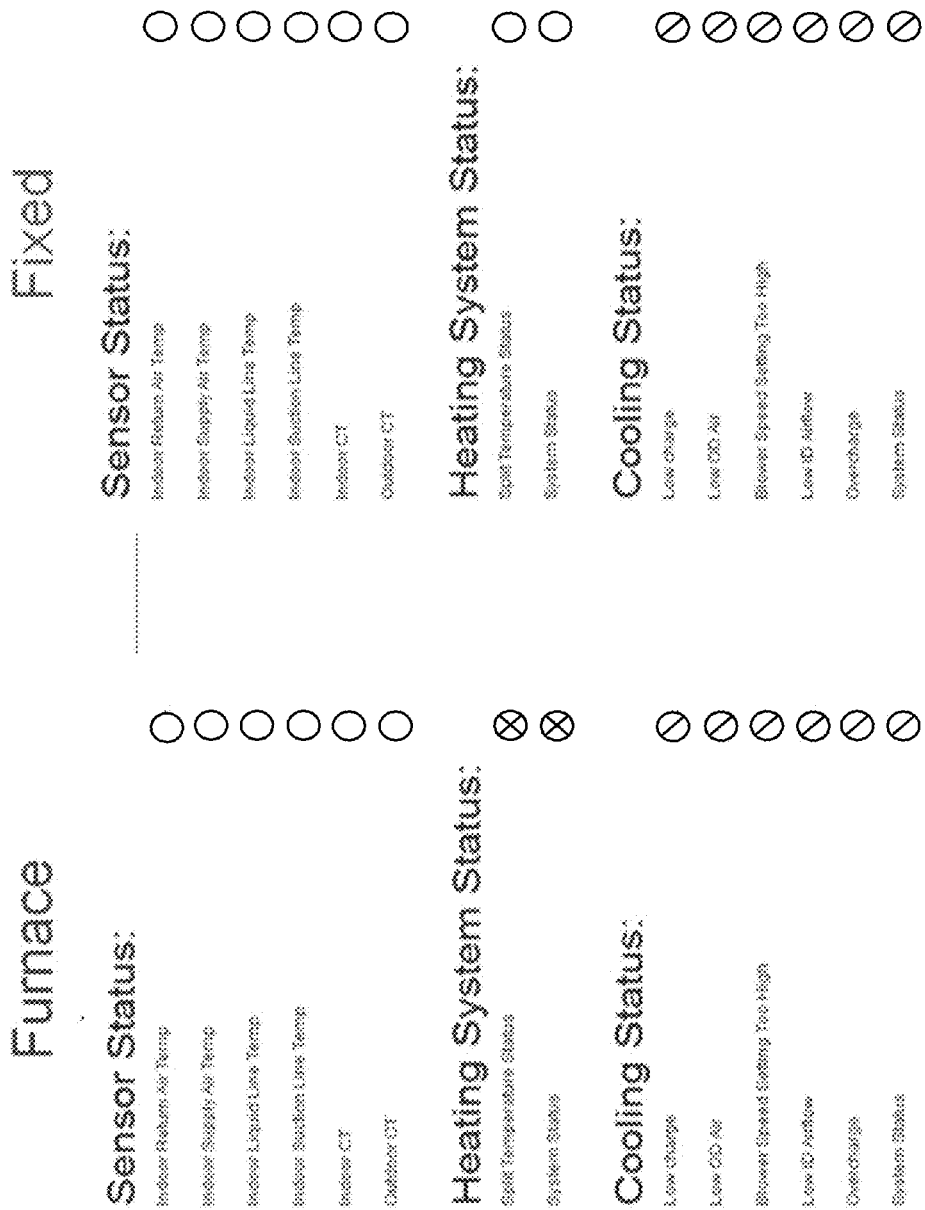

Customer View
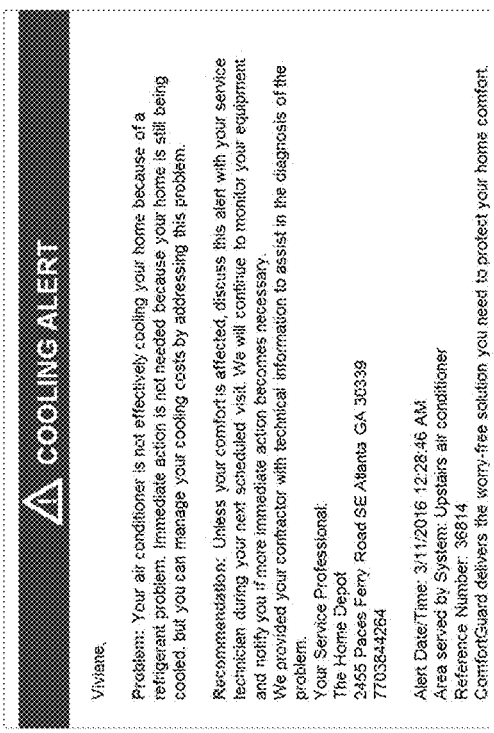
FIG. 8A
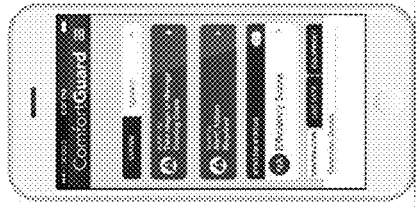
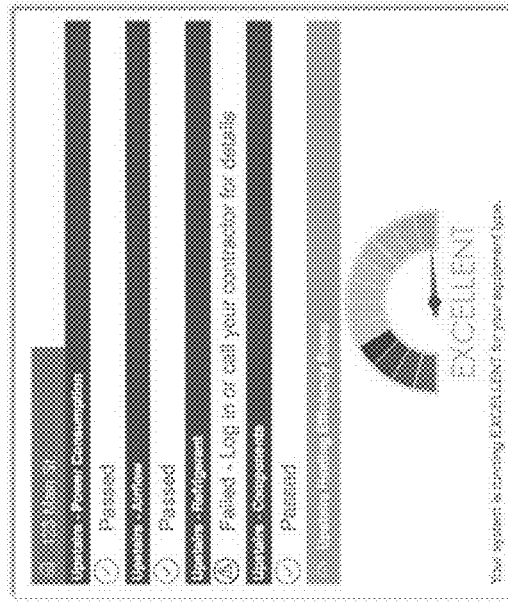
FIG. 8B

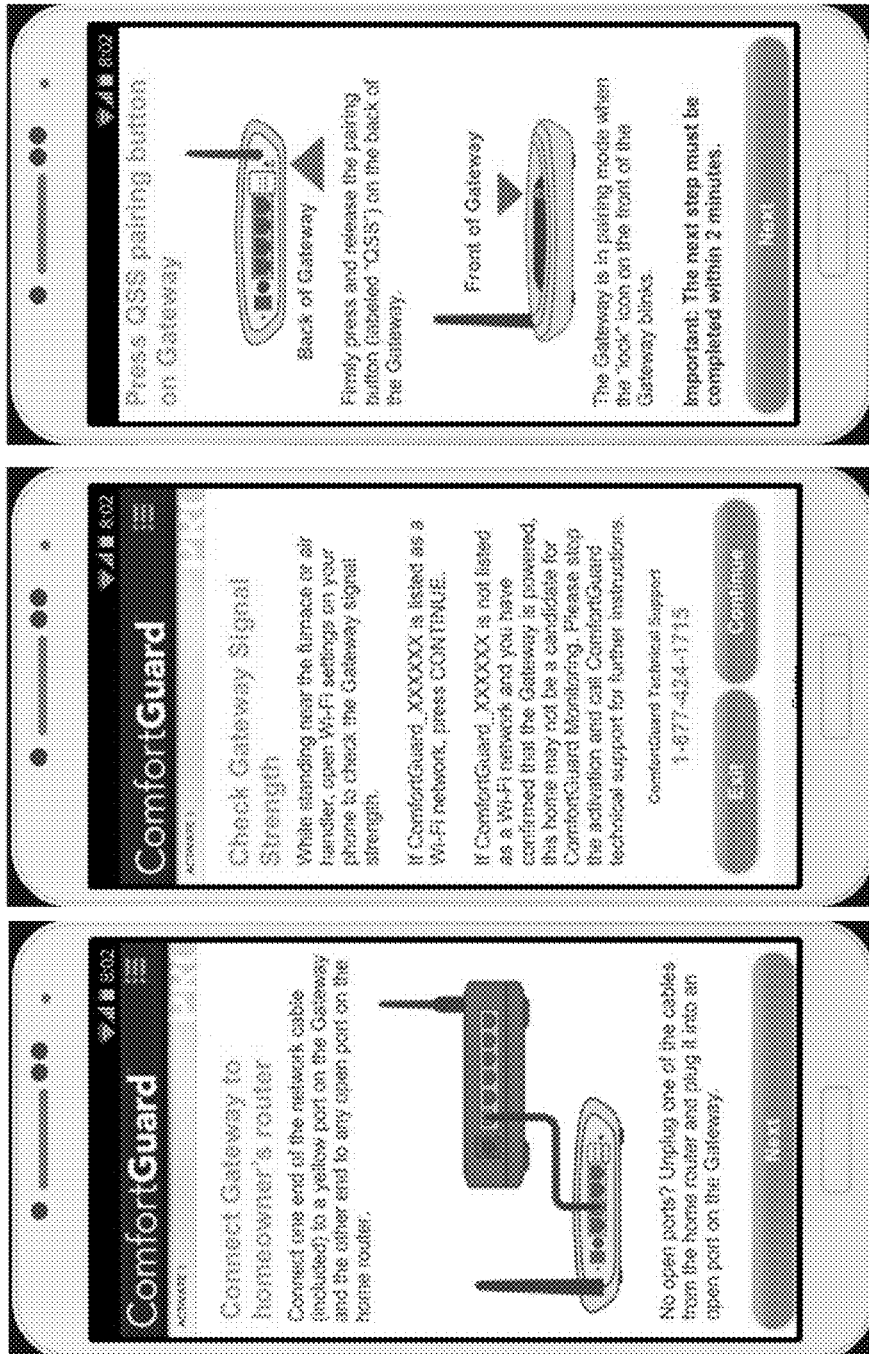

SYSTEMS AND METHODS FOR MOBILE APPLICATION FOR HVAC INSTALLATION AND DIAGNOSTICS

CROSS-REFERENCE TO RELATED APPLICATIONS

This application claims the benefit of U.S. Provisional Application No. 62/320,947, filed on Apr. 11, 2016. The entire disclosure of the above application is incorporated herein by reference.

FIELD

The present disclosure relates to systems and methods for mobile applications for HVAC (heating, ventilation, or air conditioning) installation and diagnostics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, or air conditioning) system controls environmental parameters, such as temperature and humidity, of a building. The target values for the environmental parameters, such as a temperature set point, may be specified by a user or owner of the building, such as an employee working in the building or a homeowner.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at multiple speeds or at any speed within a predetermined range. One or more switching relays (not shown) may be used to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary heat.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold, which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may simply include a run capacitor, a start capacitor, and a contactor or relay. In fact, in certain implementations, the start capacitor may be omitted, such as when a scroll compressor instead of a reciprocating compressor is being used. The compressor 148 may be a variable-capacity compressor and may respond to a multiple-level cool request. For example, the cool request may indicate a mid-capacity call for cool or a high-capacity call for cool.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Monitoring of operation of components in the condensing unit 164 and the air handler unit 136 has traditionally been performed by an expensive array of multiple discrete sensors that measure current individually for each component. For example, a first sensor may sense the current drawn by a motor, another sensor measures resistance or current flow of an igniter, and yet another sensor monitors a state of a gas valve. However, the cost of these sensors and the time required for installation of, and taking readings from, the sensors has made monitoring cost-prohibitive.

SUMMARY

A monitoring system for monitoring a heating, ventilation, and air conditioning (HVAC) system of a building including a monitoring server and a monitoring client in communication with the monitoring server that provides a user interface with a user. The monitoring server is configured to receive an aggregate control line current value from a monitoring device. The aggregate control line current value represents a total current flowing through control lines used by a thermostat to command the HVAC system. The monitoring server is also configured to determine a commanded operating mode of the HVAC system in response to the aggregate control line current value, wherein operating modes of the HVAC system include at least one of an idle mode and an ON mode. The monitoring server is further configured to analyze a system condition of the HVAC system based on the determined commanded operating mode. The monitoring client is configured to command the monitoring server to execute validation testing, display results of validation testing, display real-time system performance data, and display an alert during a system malfunction.

A monitoring system for monitoring a heating, ventilation, and air conditioning (HVAC) system of a building is provided. The monitoring system includes a monitoring server configured to receive an aggregate current value from a monitoring device, wherein the aggregate current value represents a total current flowing through the HVAC system, determine a commanded operating mode of the HVAC system in response to the aggregate current value, wherein operating modes of the HVAC system include at least one of an idle mode and an ON mode, and analyze a system condition of the HVAC system based on the determined commanded operating mode. The monitoring system further includes a monitoring client in communication with the monitoring server and providing a user interface with a user, the monitoring client configured to command the monitoring server to execute validation testing based on data received from monitoring the HVAC system, display results of validation testing, display real-time system performance data, and display an alert during a system malfunction.

In other features, the monitoring client is further configured to receive and display instructions for performing a corrective action on the HVAC system.

In other features, the corrective action includes at least one of re-installing a previously installed sensor, re-installing a previously installed system component, and revising a system setting.

In other features, the monitoring client is further configured to receive user input including at least one of text input and voice recording input after displaying the instructions for performing the corrective action on the HVAC system.

In other features, the monitoring client is further configured to receive user input including at least one of text input and voice recording input and to send the user input to the monitoring server for storage with data associated with the HVAC system.

In other features, the monitoring client is further configured to receive user input for a request for energy certification and send a message to the monitoring server indicating the request for energy certification and wherein the monitoring server is configured to send data associated with the HVAC system to a third-party energy certification entity.

In other features, the data sent to the third-party energy certification entity includes power data associated with the HVAC system.

A method for monitoring a heating, ventilation, and air conditioning (HVAC) system of a building is provided. The method includes receiving, with a monitoring server, an aggregate current value from a monitoring device, wherein the aggregate current value represents a total current flowing through the HVAC system. The method also includes determining, with the monitoring server, a commanded operating mode of the HVAC system in response to the aggregate current value, wherein operating modes of the HVAC system include at least one of an idle mode and an ON mode. The method also includes analyzing, with the monitoring server, a system condition of the HVAC system based on the determined commanded operating mode. The method also includes receiving from a monitoring client, with the monitoring server, a command to execute validation testing based on data received from monitoring the HVAC system. The method also includes sending to the monitoring client, with the monitoring server, results of validation testing for display on the monitoring client. The method also includes sending to the monitoring client, with the monitoring server, real-time system performance data for display on the monitoring client. The method also includes sending to the monitoring client, with the monitoring server, an alert during a system malfunction.

In other features, the method also includes sending to the monitoring client, with the monitoring server, instructions for performing a corrective action on the HVAC system.

In other features, the corrective action includes at least one of re-installing a previously installed sensor, re-installing a previously installed system component, and revising a system setting.

In other features, the method also includes receiving, with the monitoring server, user input from the monitoring client, the user input including at least one of text input and voice recording input.

In other features, the method also includes receiving, with the monitoring server, a request for energy certification from the monitoring client and sending data associated with the HVAC system to a third-party energy certification entity.

In other features, the data sent to the third-party energy certification entity includes power data associated with the HVAC system.

A non-transitory tangible computer readable medium storing instructions executable by a processor of a monitoring server is provided. The instructions includes receiving an aggregate current value from a monitoring device, wherein the aggregate current value represents a total current flowing through a heating, ventilation, and air conditioning (HVAC) system. The instructions further include determining a commanded operating mode of the HVAC system in response to the aggregate current value, wherein operating modes of the HVAC system include at least one of an idle mode and an ON mode. The instructions further include analyzing a system condition of the HVAC system based on the determined commanded operating mode. The instructions further include receiving from a monitoring client a command to execute validation testing based on data received from monitoring the HVAC system. The instructions further include sending to the monitoring client results of validation testing for display on the monitoring client. The instructions further include sending to the monitoring client real-time system performance data for display on the monitoring client. The instructions further include sending to the monitoring client an alert during a system malfunction.

In other features, the instructions further include sending to the monitoring client, with the monitoring server, directions for performing a corrective action on the HVAC system.

In other features, the corrective action includes at least one of re-installing a previously installed sensor, re-installing a previously installed system component, and revising a system setting.

In other features, the instructions further include receiving, with the monitoring server, user input from the monitoring client, the user input including at least one of text input and voice recording input.

In other features, the instructions further include receiving a request for energy certification from the monitoring client and sending data associated with the HVAC system to a third-party energy certification entity.

In other features, the data sent to the third-party energy certification entity includes power data associated with the HVAC system.

BRIEF DESCRIPTION OF THE DRAWINGS

The present disclosure will become more fully understood from the detailed description and the accompanying drawings.

FIGS. 5A-5B are additional sample screen shots of outputs of a monitoring client on a customer device.

FIGS. 6A-6B are additional sample screen shots of outputs of a monitoring client on a customer device.

FIG. 8A is a sample screen shot for an alert on an end-user's device.

FIG. 8B is a sample screen shot of a monthly system report from a monitoring client on a customer device.

Figures 14A, 14B, 14C:
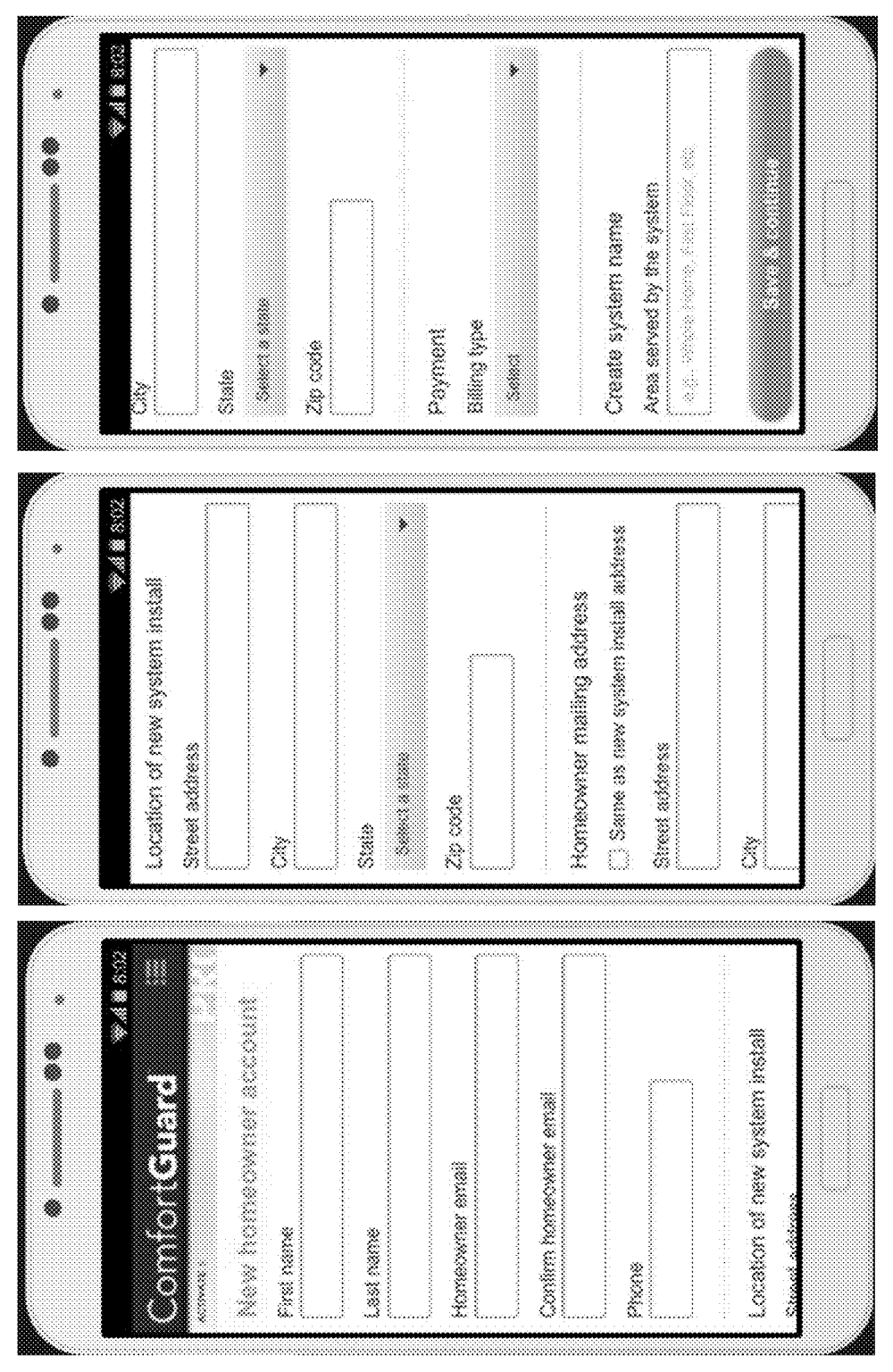

FIGS. 14A-14C are other sample screen shots for setting up an account on a monitoring client.

FIGS. 15A-15F are sample screen shots for assigning HVAC equipment details to an account on a monitoring client.

FIG. 16 is a sample screen shot for assigning a device ID number to an account on a monitoring client.

FIGS. 17A-17M are sample screen shots for connecting an indoor hub online using a monitoring client.

In the drawings, reference numbers may be reused to identify similar and/or identical elements.

DETAILED DESCRIPTION

According to the present disclosure, a monitoring system can be integrated with a residential or light commercial HVAC (heating, ventilation, or air conditioning) system of a building. The monitoring system can provide information on the status, maintenance, and efficiency of the HVAC system to customers and/or contractors associated with the building. For example, the building may be a single-family residence, and the customer may be the homeowner, a landlord, or a tenant. In other implementations, the building may be a light commercial building, and the customer may be the building owner, a tenant, or a property management company.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, and air conditioners. HVAC systems as described in this application do not necessarily include both heating and air conditioning, and may instead have only one or the other.

In split HVAC systems with an air handler unit (often, located indoors) and a condensing unit (often, located outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing HVAC system.

Figure 1:
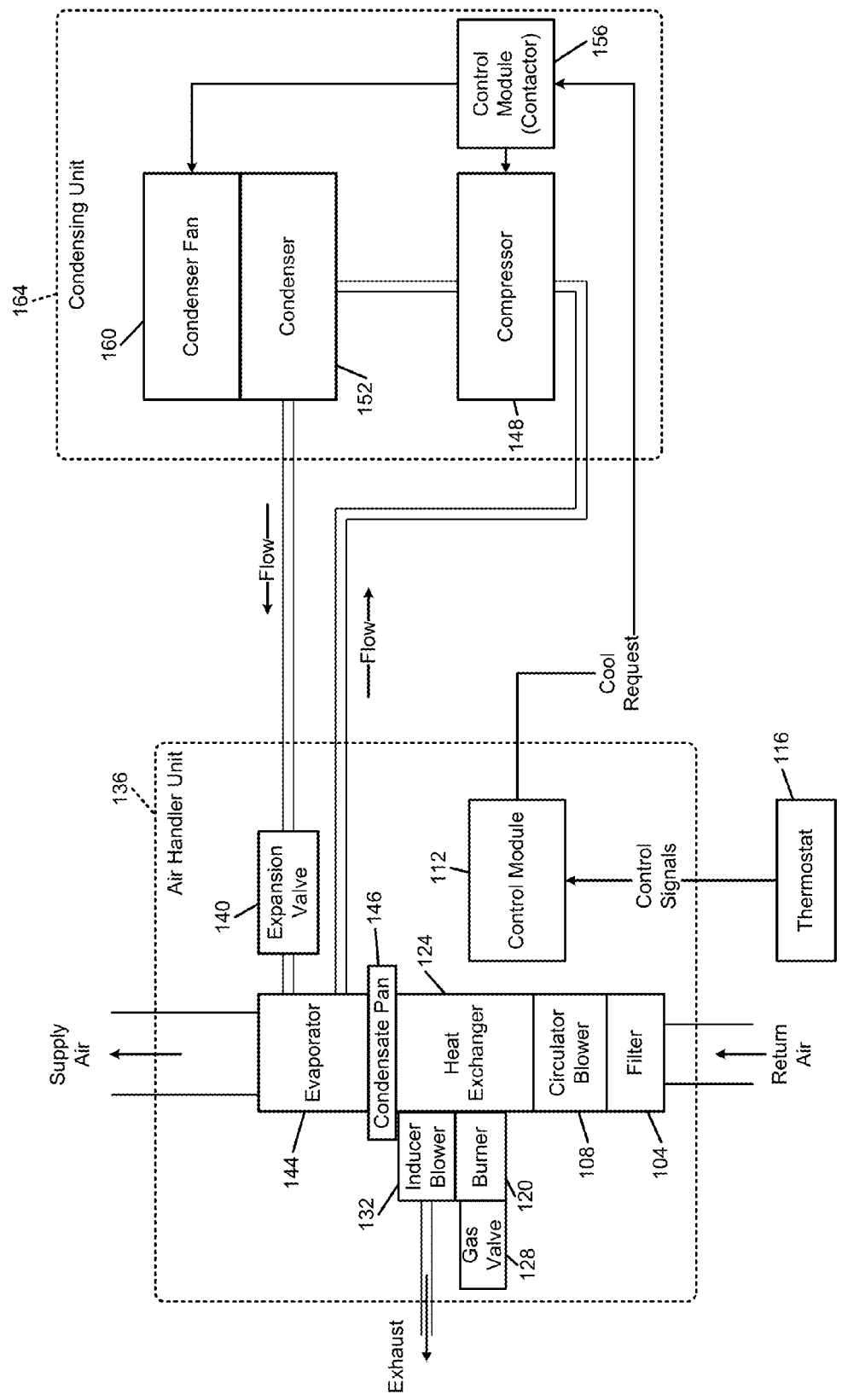
FIG. 1 is a block diagram of an example HVAC system according to the prior art.

In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building. When the flow of refrigerant is reversed, the roles of the evaporator and condenser are reversed—i.e., refrigerant evaporation occurs in what is labeled the condenser while refrigerant condensation occurs in what is labeled as the evaporator.

The air handler monitor and condensing monitor modules monitor operating parameters of associated components of the HVAC system. For example, the operating parameters may include operation status, refrigerant charge condition, airflow, return/supply air temperature split, humidity of inside and outside air, power supply current, power supply voltage, operating and ambient temperatures of inside and outside air, refrigerant temperatures at various points in the refrigerant loop, fault signals, and thermostat control signals.

The principles of the present disclosure may be applied to monitoring other systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. The monitoring system may analyze aggregate current readings to assess operation of the individual components of the hot water heater.

The air handler monitor and condensing monitor modules may communicate data between each other, while one or both of the air handler monitor and condensing monitor modules upload data to a remote location or download data from the remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and condensing monitor modules of customers who have such systems installed. The monitoring system can provide performance information, diagnostic alerts, and error messages to a customer and/or third parties, such as designated HVAC contractors.

A server of the monitoring system includes a processor and memory. The memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues affecting effectiveness or efficiency of the HVAC system, and may receive notifications related to routine maintenance. The methods of notification may take the form of push or pull updates to an application, which may be executed on a smart phone or other mobile device or on a standard computer. Notifications may also be viewed using web applications or on local displays, such as on a thermostat or other displays located throughout the building or on a display (not shown) implemented in the air handler monitor module or the condensing monitor module. Notifications may also include text messages, emails, social networking messages, voicemails, phone calls, etc.

The air handler monitor and condensing monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, remote from the customer's building or residence.

The frequency domain analysis may allow individual contributions of HVAC system components to be determined. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time-domain current stream may reduce the amount of bandwidth necessary to upload the current data. Nevertheless, the present disclosure could also be used with additional current sensors.

Based on measurements from the air handler monitor and condensing monitor modules, the monitoring company can determine whether HVAC components are operating at their peak performance and can advise the customer and the contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. The contractor can also be notified that a service call will be required. Depending on the contractual relationship between the customer and the contractor, the contractor may immediately schedule a service call to the building.

The monitoring system may provide specific information to the contractor, including identifying information of the customer's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the customer and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment upon installation and/or applying surcharges to repairs and service visits.

For the air handler monitor and condensing monitor modules, the monitoring company or contractor may charge the customer the equipment cost, including the installation cost, at the time of installation and/or may recoup these costs as part of the monthly fee. Alternatively, rental fees may be charged for the air handler monitor and condensing monitor modules, and once the monitoring service is stopped, the air handler monitor and condensing monitor modules may be returned.

The monitoring service may allow the customer and/or contractor to remotely monitor and/or control HVAC components, such as setting temperature, enabling or disabling heating and/or cooling, etc. In addition, the customer may be able to track energy usage, cycling times of the HVAC system, and/or historical data. Efficiency and/or operating costs of the customer's HVAC system may be compared against HVAC systems of neighbors, whose buildings will be subject to the same or similar environmental conditions. This allows for direct comparison of HVAC system and overall building efficiency because environmental variables, such as temperature and wind, are controlled.

The installer can provide information to the remote monitoring system including identification of control lines that were connected to the air handler monitor module and condensing monitor module. In addition, information such as the HVAC system type, year installed, manufacturer, model number, BTU rating, filter type, filter size, tonnage, etc.

In addition, because the condensing unit may have been installed separately from the furnace, the installer may also record and provide to the remote monitoring system the manufacturer and model number of the condensing unit, the year installed, the refrigerant type, the tonnage, etc. Upon installation, baseline tests are run. For example, this may include running a heating cycle and a cooling cycle, which the remote monitoring system records and uses to identify initial efficiency metrics. Further, baseline profiles for current, power, and frequency domain current can be established.

The server may store baseline data for the HVAC system of each building. The baselines can be used to detect changes indicating impending or existing failures. For example only, frequency-domain current signatures of failures of various components may be preprogrammed, and may be updated based on observed evidence from contractors. For example, once a malfunction in an HVAC system is recognized, the monitoring system may note the frequency data leading up to the malfunction and correlate that frequency signature with frequency signatures associated with potential causes of the malfunction. For example only, a computer learning system, such as a neural network or a genetic algorithm, may be used to refine frequency signatures. The frequency signatures may be unique to different types of HVAC systems but may share common characteristics. These common characteristics may be adapted based on the specific type of HVAC system being monitored.

The installer may collect a device fee, an installation fee, and/or a subscription fee from the customer. In various implementations, the subscription fee, the installation fee, and the device fee may be rolled into a single system fee, which the customer pays upon installation. The system fee may include the subscription fee for a set number of years, such as 1, 2, 5, or 10, or may be a lifetime subscription, which may last for the life of the home or the ownership of the building by the customer.

The monitoring system can be used by the contractor during and after installation and during and after repair (i) to verify operation of the air handler monitor and condensing monitor modules, as well as (ii) to verify correct installation of the components of the HVAC system. In addition, the customer may review this data in the monitoring system for assurance that the contractor correctly installed and configured the HVAC system. In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and set points of the HVAC system. The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and condensing monitor modules in return for access to this information. Installation and service contractors may also subsidize some or all of these costs in return for access to this information, and for example, in exchange for being recommended by the monitoring system. Based on historical service data and customer feedback, the monitoring system may provide contractor recommendations to customers.

Figure 2A:
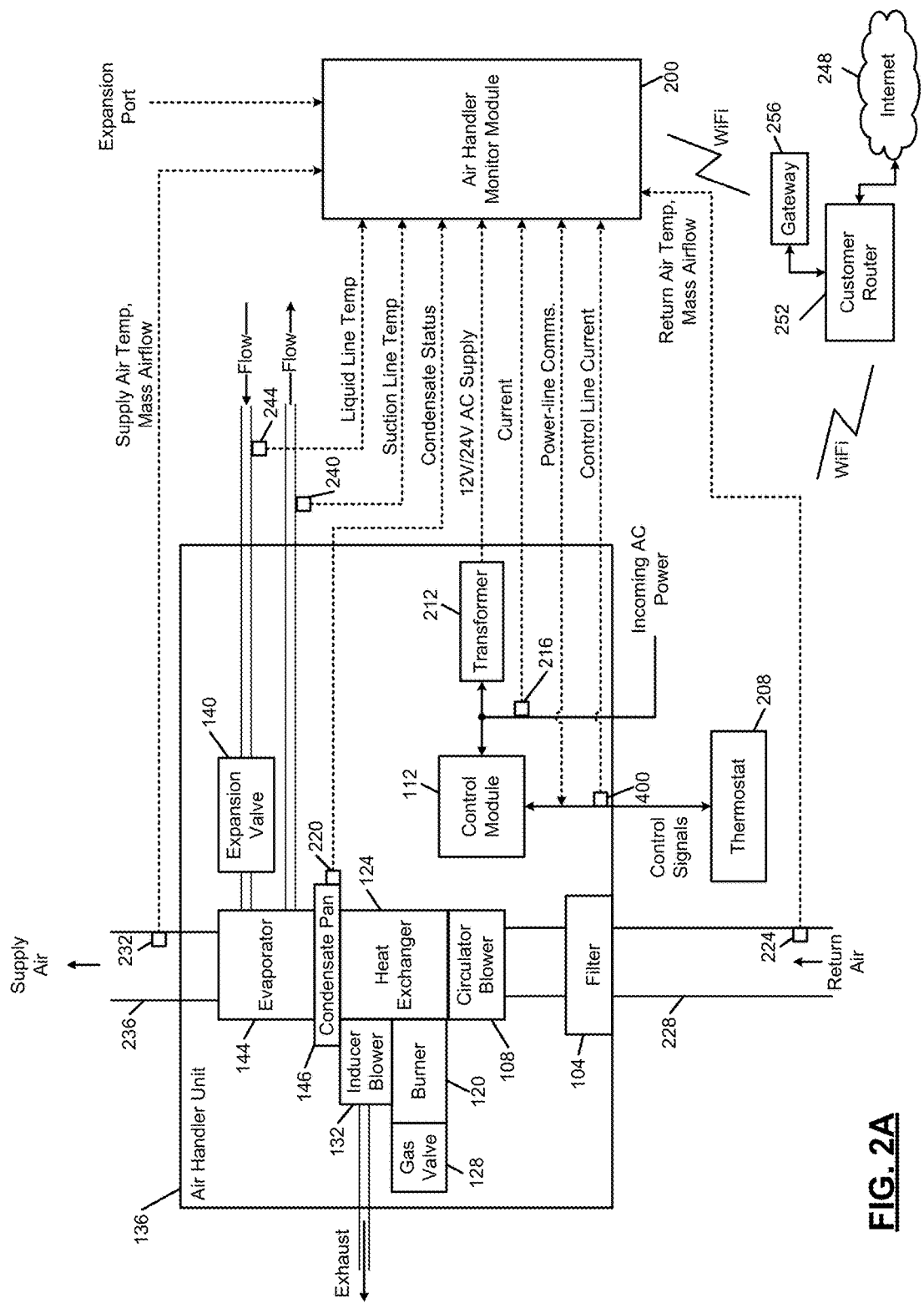
FIG. 2A is a functional block diagram of an example HVAC system including an implementation of an air handler monitor module.
Figure 2B:
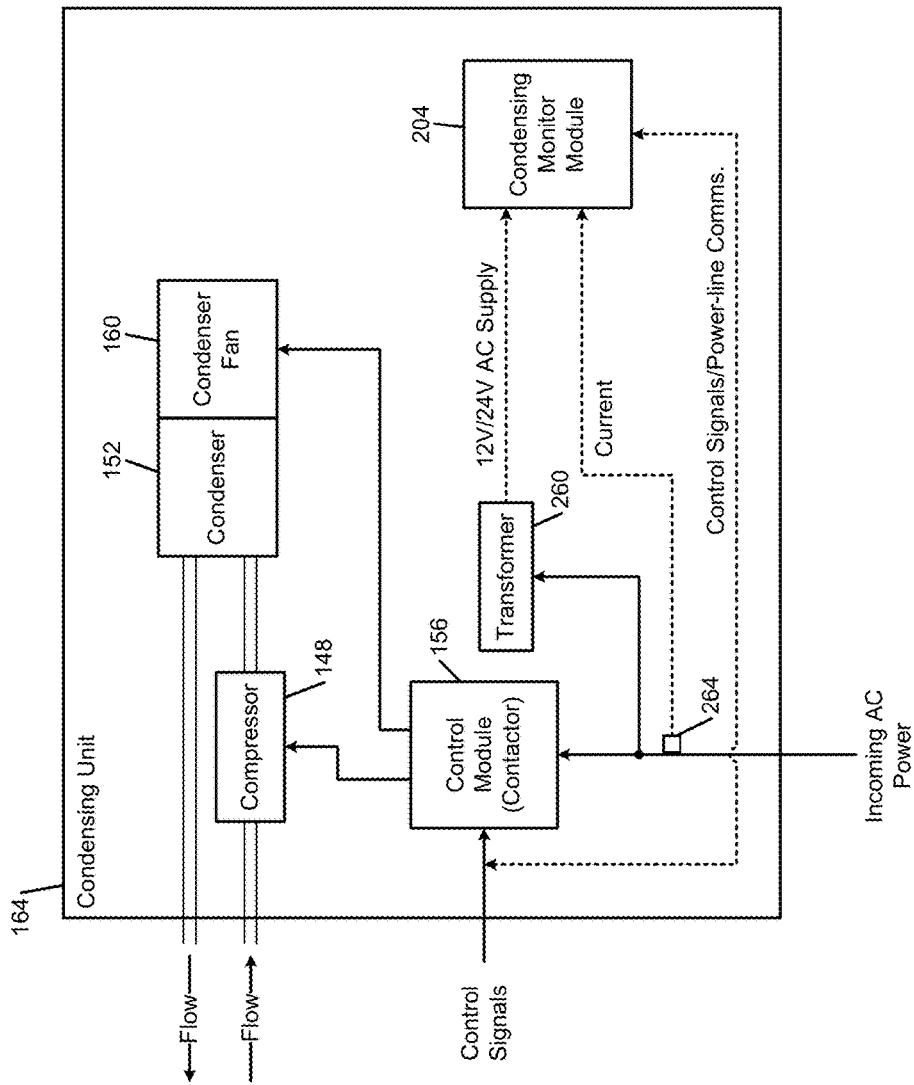
FIG. 2B is a functional block diagram of an example HVAC system including an implementation of a condensing monitor module.

FIGS. 2A-2B are functional block diagrams of an example monitoring system associated with an HVAC system of a building. The air handler unit 136 of FIG. 1 is shown for reference. Because the monitoring systems of the present disclosure can be used in retrofit applications, elements of the air handler unit 136 may remain unmodified.

An air handler monitor module 200 and a condensing monitor module 204 can be installed in an existing system without needing to replace the original thermostat 116 shown in FIG. 1. To enable certain additional functionality, however, such as WiFi thermostat control and/or thermostat display of alert messages, the thermostat 116 of FIG. 1 may be replaced with a thermostat 208 having networking capability.

In many systems, the air handler unit 136 is located inside the building, while the condensing unit 164 is located outside the building. The present disclosure is not limited, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, the air handler monitor module 200 is shown external to the air handler unit 136, although the air handler monitor module 200 may be physically located outside of, in contact with, or even inside of an enclosure, such as a sheet metal casing, of the air handler unit 136.

When installing the air handler monitor module 200 in the air handler unit 136, power is provided to the air handler monitor module 200. For example, a transformer 212 can be connected to an AC line in order to provide AC power to the air handler monitor module 200. The air handler monitor module 200 may measure voltage of the incoming AC line based on this transformed power supply. For example, the transformer 212 may be a 10-to-1 transformer and therefore provide either a 12V or 24V AC supply to the air handler monitor module 200 depending on whether the air handler unit 136 is operating on nominal 120 volt or nominal 240 volt power. The air handler monitor module 200 then receives power from the transformer 212 and determines the AC line voltage based on the power received from the transformer 212.

For example, frequency, amplitude, RMS voltage, and DC offset may be calculated based on the measured voltages. In situations where 3-phase power is used, the order of the phases may be determined. Information about when the voltage crosses zero may be used to synchronize various measurements and to determine frequency of the AC power based on counting the number of zero crossings within a predetermine time period.

A current sensor 216 measures incoming current to the air handler unit 136. The current sensor 216 may include a current transformer that snaps around one power lead of the incoming AC power. The current sensor 216 may alternatively include a current shunt or a hall effect device. In various implementations, a power sensor (not shown) may be used in addition to or in place of the current sensor 216.

In various other implementations, electrical parameters (such as voltage, current, and power factor) may be measured at a different location, such as at an electrical panel providing power to the building from the electrical utility.

For simplicity of illustration, the control module 112 is not shown to be connected to the various components and sensors of the air handler unit 136. In addition, routing of the AC power to various powered components of the air handler unit 136, such as the circulator blower 108, the gas valve 128, and the inducer blower 132, are also not shown for simplicity. The current sensor 216 measures the current entering the air handler unit 136 and therefore represents an aggregate current of the current-consuming components of the air handler unit 136.

The control module 112 controls operation in response to signals from a thermostat 208 received over control lines. The air handler monitor module 200 monitors the control lines. The control lines may include a call for cool, a call for heat, and a call for fan. The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

The control lines may be monitored by attaching leads to terminal blocks at the control module 112 at which the fan and heat signals are received. These terminal blocks may include additional connections where leads can be attached between these additional connections and the air handler monitor module 200. Alternatively, leads from the air handler monitor module 200 may be attached to the same location as the fan and heat signals, such as by putting multiple spade lugs underneath a signal screw head.

In various implementations, the cool signal from the thermostat 208 may be disconnected from the control module 112 and attached to the air handler monitor module 200. The air handler monitor module 200 can then provide a switched cool signal to the control module 112. This allows the air handler monitor module 200 to interrupt operation of the air conditioning system, such as upon detection of water by one of the water sensors. The air handler monitor module 200 may also interrupt operation of the air conditioning system based on information from the condensing monitor module 204, such as detection of a locked rotor condition in the compressor.

A condensate sensor 220 measures condensate levels in the condensate pan 146. If a level of condensate gets too high, this may indicate a plug or clog in the condensate pan 146 or a problem with hoses or pumps used for drainage from the condensate pan 146. The condensate sensor 220 may be installed along with the air handler monitor module 200 or may already be present. When the condensate sensor 220 is already present, an electrical interface adapter may be used to allow the air handler monitor module 200 to receive the readings from the condensate sensor 220. Although shown in FIG. 2A as being internal to the air handler unit 136, access to the condensate pan 146, and therefore the location of the condensate sensor 220, may be external to the air handler unit 136.

Additional water sensors, such as a conduction (wet floor) sensor may also be installed. The air handler unit 136 may be located on a catch pan, especially in situations where the air handler unit 136 is located above living space of the building. The catch pan may include a float switch. When enough liquid accumulates in the catch pan, the float switch provides an over-level signal, which may be sensed by the air handler monitor module 200.

A return air sensor 224 is located in a return air plenum 228. The return air sensor 224 may measure temperature and may also measure mass airflow. In various implementations, a thermistor may be multiplexed as both a temperature sensor and a hot wire mass airflow sensor. In various implementations, the return air sensor 224 is upstream of the filter 104 but downstream of any bends in the return air plenum 228.

A supply air sensor 232 is located in a supply air plenum 236. The supply air sensor 232 may measure air temperature and may also measure mass airflow. The supply air sensor 232 may include a thermistor that is multiplexed to measure both temperature and, as a hot wire sensor, mass airflow. In various implementations, such as is shown in FIG. 2A, the supply air sensor 232 may be located downstream of the evaporator 144 but upstream of any bends in the supply air plenum 236.

A differential pressure reading may be obtained by placing opposite sensing inputs of a differential pressure sensor (not shown) in the return air plenum 228 and the supply air plenum 236, respectively. For example only, these sensing inputs may be collocated or integrated with the return air sensor 224 and the supply air sensor 232, respectively. In various implementations, discrete pressure sensors may be placed in the return air plenum 228 and the supply air plenum 236. A differential pressure value can then be calculated by subtracting the individual pressure values.

The air handler monitor module 200 also receives a suction line temperature from a suction line temperature sensor 240. The suction line temperature sensor 240 measures refrigerant temperature in the refrigerant line between the evaporator 144 of FIG. 2A and the compressor 148 of FIG. 2B. A liquid line temperature sensor 244 measures the temperature of refrigerant in a liquid line traveling from the condenser 152 of FIG. 2B to the expansion valve 140 of FIG. 2A.

The air handler monitor module 200 may include one or more expansion ports to allow for connection of additional sensors and/or to allow connection to other devices, such as a home security system, a proprietary handheld device for use by contractors, or a portable computer.

The air handler monitor module 200 also monitors control signals from the thermostat 208. Because one or more of these control signals is also transmitted to the condensing unit 164 of FIG. 2B, these control signals can be used for communication between the air handler monitor module 200 and the condensing monitor module 204 of FIG. 2B.

The air handler monitor module 200 may transmit frames of data corresponding to periods of time. For example only, 7.5 frames may span one second (i.e., 0.1333 seconds per frame). Each frame of data may include voltage, current, temperatures, control line status, and water sensor status. Calculations may be performed for each frame of data, including averages, powers, RMS, and FFT. Then the frame is transmitted to the monitoring system.

The voltage and current signals may be sampled by an analog-to-digital converter at a certain rate, such as 1920 samples per second. The frame length may be measured in terms of samples. When a frame is 256 samples long, at a sample rate of 1920 samples per second, there will be 7.5 frames per second.

The sampling rate of 1920 Hz has a Nyquist frequency of 960 Hz and therefore allows an FFT bandwidth of up to approximately 960 Hz. An FFT limited to the time span of a single frame may be calculated for each frame. Then, for that frame, instead of transmitting all of the raw current data, only statistical data (such as average current) and frequency-domain data are transmitted.

This gives the monitoring system current data having a 7.5 Hz resolution, and gives frequency-domain data with approximately the 960 Hz bandwidth. The time-domain current and/or the derivative of the time-domain current may be analyzed to detect impending or existing failures. In addition, the current and/or the derivative may be used to determine which set of frequency-domain data to analyze. For example, certain time-domain data may indicate the approximate window of activation of a hot surface igniter, while frequency-domain data is used to assess the state of repair of the hot surface igniter.

In various implementations, the air handler monitor module 200 may only transmit frames during certain periods of time. These periods may be critical to operation of the HVAC system. For example, when thermostat control lines change, the air handler monitor module 200 may record data and transmit frames for a predetermined period of time after that transition. Then, if the HVAC system is operating, the air handler monitor module 200 may intermittently record data and transmit frames until operation of the HVAC system has completed.

The air handler monitor module 200 transmits data measured by both the air handler monitor module 200 itself and the condensing monitor module 204 over a wide area network 248, such as the Internet (referred to as the Internet 248). The air handler monitor module 200 may access the Internet 248 using a router 252 of the customer. The customer router 252 may already be present to provide Internet access to other devices (not shown) within the building, such as a customer computer and/or various other devices having Internet connectivity, such as a DVR (digital video recorder) or a video gaming system.

The air handler monitor module 200 communicates with the customer router 252 using a proprietary or standardized, wired or wireless protocol, such as Bluetooth, ZigBee (IEEE 802.15.4), 900 Megahertz, 2.4 Gigahertz, WiFi (IEEE 802.11). In various implementations, a gateway 256 is implemented, which creates a wireless network with the air handler monitor module 200. The gateway 256 may interface with the customer router 252 using a wired or wireless protocol, such as Ethernet (IEEE 802.3).

The thermostat 208 may also communicate with the customer router 252 using WiFi. Alternatively, the thermostat 208 may communicate with the customer router 252 via the gateway 256. In various implementations, the air handler monitor module 200 and the thermostat 208 do not communicate directly. However, because they are both connected through the customer router 252 to a remote monitoring system, the remote monitoring system may allow for control of one based on inputs from the other. For example, various faults identified based on information from the air handler monitor module 200 may cause the remote monitoring system to adjust temperature set points of the thermostat 208 and/or display warning or alert messages on the thermostat 208.

In various implementations, the transformer 212 may be omitted, and the air handler monitor module 200 may include a power supply that is directly powered by the incoming AC power. Further, power-line communications may be conducted over the AC power line instead of over a lower-voltage HVAC control line.

In various implementations, the current sensor 400 may be omitted, and instead a voltage sensor (not shown) may be used. The voltage sensor measures the voltage of an output of a transformer internal to the control module 112, the internal transformer providing the power (e.g., 24 Volts) for the control signals. The air handler monitor module 200 may measure the voltage of the incoming AC power and calculate a ratio of the voltage input to the internal transformer to the voltage output from the internal transformer. As the current load on the internal transformer increases, the impedance of the internal transformer causes the voltage of the output power to decrease. Therefore, the current draw from the internal transformer can be inferred from the measured ratio (also called an apparent transformer ratio). The inferred current draw may be used in place of the measured aggregate current draw described in the present disclosure.

In FIG. 2B, the condensing monitor module 204 is installed in the condensing unit 164. A transformer 260 converts incoming AC voltage into a stepped-down voltage for powering the condensing monitor module 204. In various implementations, the transformer 260 may be a 10-to-1 transformer. A current sensor 264 measures current entering the condensing unit 164. The condensing monitor module 204 may also measure voltage from the supply provided by the transformer 260. Based on measurements of the voltage and current, the condensing monitor module 204 may calculate power and/or may determine power factor.

A liquid line temperature sensor 266 measures the temperature of refrigerant traveling from the condenser 152 to the air handler unit 136. In various implementations, the liquid line temperature sensor 266 is located prior to any filter-drier, such as the filter-drier 154 of FIG. 2A. In normal operation, the liquid line temperature sensor 266 and the liquid line temperature sensor 246 of FIG. 2A may provide similar data, and therefore one of the liquid line temperature sensors 246 or 266 may be omitted. However, having both of the liquid line temperature sensors 246 and 266 may allow for certain problems to be diagnosed, such as a kink or other restriction in the refrigerant line between the air handler unit 136 and the condensing unit 164.

In various implementations, the condensing monitor module 204 may receive ambient temperature data from a temperature sensor (not shown). When the condensing monitor module 204 is located outdoors, the ambient temperature represents an outside ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on geographical location of the building may be used to determine sun load, outside ambient air temperature, precipitation, and humidity.

In various implementations, the condensing monitor module 204 may receive refrigerant temperature data from refrigerant temperature sensors (not shown) located at various points, such as before the compressor 148 (referred to as a suction line temperature), after the compressor 148 (referred to as a compressor discharge temperature), after the condenser 152 (referred to as a liquid line out temperature), and/or at one or more points along a coil of the condenser 152. The location of temperature sensors may be dictated by a physical arrangement of the condenser coils. Additionally or alternatively to the liquid line out temperature sensor, a liquid line in temperature sensor may be used. An approach temperature may be calculated, which is a measure of how close the condenser 152 has been able to bring the liquid line out temperature to the ambient air temperature.

During installation, the location of the temperature sensors may be recorded. Additionally or alternatively, a database may be maintained that specifies where temperature sensors are placed. This database may be referenced by installers and may allow for accurate remote processing of the temperature data. The database may be used for both air handler sensors and compressor/condenser sensors. The database may be prepopulated by the monitoring company or may be developed by trusted installers, and then shared with other installation contractors.

As described above, the condensing monitor module 204 may communicate with the air handler monitor module 200 over one or more control lines from the thermostat 208. In these implementations, data from the condensing monitor module 204 is transmitted to the air handler monitor module 200, which in turn uploads the data over the Internet 248.

In various implementations, the transformer 260 may be omitted, and the condensing monitor module 204 may include a power supply that is directly powered by the incoming AC power. Further, power-line communications may be conducted over the AC power line instead of over a lower-voltage HVAC control line.

Figure 2C:
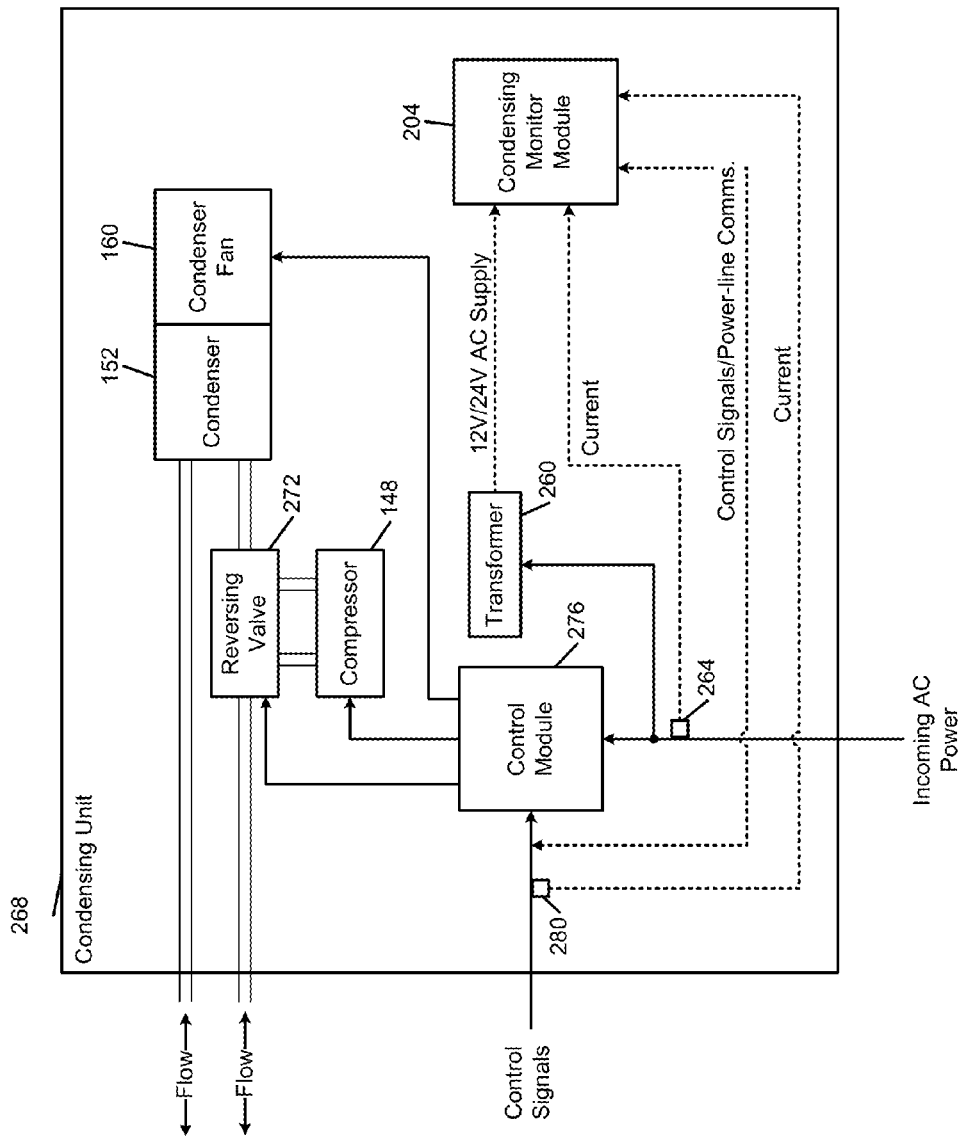
FIG. 2C is a functional block diagram of an example HVAC system based on a heat pump.

In FIG. 2C, an example condensing unit 268 is shown for a heat pump implementation. The condensing unit 268 may be configured similarly to the condensing unit 164 of FIG. 2B. Similarly to FIG. 2B, the transformer 260 may be omitted in various implementations. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode).

In various implementations, a current sensor 280 is implemented to measure one or more currents of the control signals. The current sensor 280 may measure an aggregate current of all the control lines arriving at the condensing unit 268. The aggregate current may be obtained by measuring the current of a common control return conductor. The aggregate current measured by the current sensor 280 may be used to determine the state of multiple heat pump control signals, such as signals that control operation of defrosting functions and the reversing valve. The aggregate current measured by the current sensor 280 may also be used to determine the state of calls for varying levels of compressor capacity. While not shown, the current sensor 280 may similarly be installed in the condensing unit 164.

Figure 3:
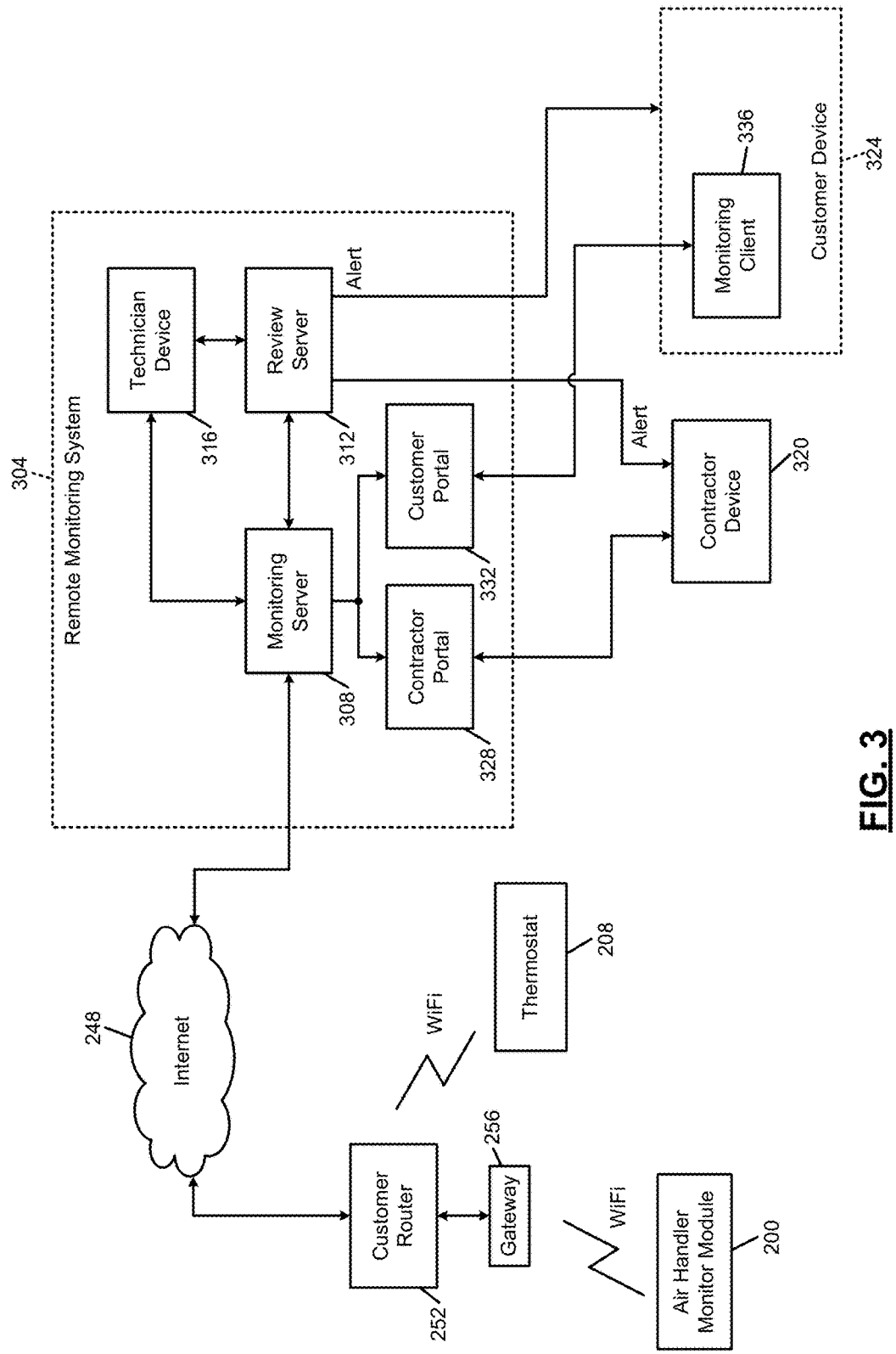
FIG. 3 is a high level functional block diagram of an example system including an implementation of a remote monitoring system.

In FIG. 3, the air handler monitor module 200 and the thermostat 208 are shown communicating, using the customer router 252, with a remote monitoring system 304 via the Internet 248. In other implementations, the condensing monitor module 204 may transmit data from the air handler monitor module 200 and the condensing monitor module 204 to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 304 includes a monitoring server 308 that receives data from the air handler monitor module 200 and the thermostat 208 and maintains and verifies network continuity with the air handler monitor module 200. The monitoring server 308 executes various algorithms to identify problems, such as failures or decreased efficiency, and to predict impending faults.

The monitoring server 308 may notify a review server 312 when a problem is identified or a fault is predicted. This programmatic assessment may be referred to as an advisory. Some or all advisories may be triaged by a technician to reduce false positives and potentially supplement or modify data corresponding to the advisory. For example, a technician device 316 operated by a technician is used to review the advisory and to monitor data (in various implementations, in real-time) from the air handler monitor module 200 via the monitoring server 308.

The technician using the technician device 316 reviews the advisory. If the technician determines that the problem or fault is either already present or impending, the technician instructs the review server 312 to send an alert to either or both of a contractor device 320 or a customer device 324. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the contractor device 320 and/or the customer device 324 with additional information that may be helpful in identifying the urgency of addressing the alert and presenting data that may be useful for diagnosis or troubleshooting.

In various implementations, minor problems may be reported to the contractor device 320 only so as not to alarm the customer or inundate the customer with alerts. Whether the problem is considered to be minor may be based on a threshold. For example, an efficiency decrease greater than a predetermined threshold may be reported to both the contractor and the customer, while an efficiency decrease less than the predetermined threshold is reported to only the contractor.

In some circumstances, the technician may determine that an alert is not warranted based on the advisory. The advisory may be stored for future use, for reporting purposes, and/or for adaptive learning of advisory algorithms and thresholds. In various implementations, a majority of generated advisories may be closed by the technician without sending an alert.

Based on data collected from advisories and alerts, certain alerts may be automated. For example, analyzing data over time may indicate that whether a certain alert is sent by a technician in response to a certain advisory depends on whether a data value is on one side of a threshold or another. A heuristic can then be developed that allows those advisories to be handled automatically without technician review. Based on other data, it may be determined that certain automatic alerts had a false positive rate over a threshold. These alerts may be put back under the control of a technician.

In various implementations, the technician device 316 may be remote from the remote monitoring system 304 but connected via a wide area network. For example only, the technician device 316 may include a computing device such as a laptop, desktop, or tablet.

With the contractor device 320, the contractor can access a contractor portal 328, which provides historical and real-time data from the air handler monitor module 200. The contractor using the contractor device 320 may also contact the technician using the technician device 316. The customer using the customer device 324 may access a customer portal 332 in which a graphical view of the system status as well as alert information is shown. The contractor portal 328 and the customer portal 332 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 328. In various implementations, the contractor device 320 can be used to request data from the air handler monitor module 200, such as when commissioning a new installation.

In various implementations, some of all of the functionality of the remote monitoring system 304 may be local instead of remote from the building. For example only, some or all of the functionality may be integrated with the air handler monitor module 200 or the condensing monitor module 204. Alternatively, a local controller may implement some of all of the functionality of the remote monitoring system 304.

Detection of various faults may require knowledge of which mode the HVAC system is operating in, and more specifically, which mode has been commanded by the thermostat. A heating fault may be identified when, for a given call for heat pattern, the supply/return air temperature split indicates insufficient heating. The threshold may be set at a predetermined percentage of the expected supply/return air temperature split.

A heating shutdown fault may be determined when a temperature split rises to within an expected range but then falls below the expected range. This may indicate that one or more of the pressure sensors has caused the heating to stop. As these shutdowns become more frequent, a more severe fault may be declared, indicating that the heater may soon fail to provide adequate heat for the conditioned space because the heater is repeatedly shutting down.

When a call for heat is made, the furnace will progress through a sequence of states. For example only, the sequence may begin with activating the inducer blower, opening the gas valve, igniting the gas, and turning on the circulator blower. Each of these states may be detectable in current data, although frequency-domain as well as time-domain data may be necessary to reliably determine certain states. When this sequence of states appears to indicate that the furnace is restarting, a fault may be declared. A furnace restart may be detected when the measured current matches a baseline current profile for a certain number of states and then diverges from the baseline current profile for the next state or states.

Furnace restarts may occur occasionally for various reasons, but as the number and frequency of furnace restart events increases, an eventual fault is predicted. For example only, if 50% of calls for heat involve one or more furnace restarts, a fault may be declared indicating that soon the furnace may fail to start altogether or may require so many restarts that sufficient heating will not be available.

An overheating fault may be declared when a temperature exceeds an expected value, such a baseline value, by more than a predetermined amount. For example, when the supply/return air temperature split is greater than a predetermined threshold, the heat exchanger may be operating at too high of a temperature.

A flame rollout switch is a safety device that detects overly high burner assembly temperatures, which may be caused by a reduction in airflow, such as a restricted flue. A fault in the flame rollout switch may be diagnosed based on states of the furnace sequence, as determined by measured current. For example, a trip of the flame rollout switch may generally occur during the same heating state for a given system. In various implementations, the flame rollout switch will be a single-use protection mechanism, and therefore a trip of the flame rollout switch is reported as a fault that will prevent further heating from occurring.

A blower fault is determined based on variation of measured current from a baseline. The measured current may be normalized according to measured voltage, and differential pressure may also be used to identify a blower fault. As the duration and magnitude of deviation between the measured current and the expected current increase, the severity of the fault increases. As the current drawn by the blower goes up, the risk of a circuit breaker or internal protection mechanism tripping increases, which may lead to loss of heating.

A permanent-split capacitor motor is a type of AC induction motor. A fault in this motor may be detected based on variation of power, power factor, and variation from a baseline. A fault in this motor, which may be used as a circulator blower, may be confirmed based on a differential air pressure. As the deviation increases, the severity of the fault increases.

A fault with spark ignition may be detected based on fault of the furnace to progress passed the state at which the spark ignition should ignite the air/fuel mixture. A signature of the spark igniter may be baselined in the frequency domain. Absence of this profile at the expected time may indicate that the spark igniter has failed to operate. Meanwhile, when a profile corresponding to the spark igniter is present but deviates from the baseline, this is an indication that the spark igniter may be failing. As the variation from the baseline increases, the risk of fault increases. In addition to current-based furnace state monitoring, the supply/return temperature split may verify that the heater has failed to commence heating.

A hot surface igniter fault is detected based on analyzing current to determine furnace states. When the current profile indicates that igniter retries have occurred, this may indicate an impending fault of the hot surface igniter. In addition, changes in the igniter profile compared to a baseline may indicate an impending fault. For example, an increase in drive level indicated in either time-domain or frequency-domain current data, an increase in effective resistance, or frequency domain indication of internal arcing may indicate an impending fault of the hot surface igniter.

A fault in the inducer fan or blower is detected based on heater states determined according to current. Faults may be predicted based on frequency domain analysis of inducer fan operation that indicate operational problems, such as fan blades striking the fan housing, water being present in the housing, bearing issues, etc. In various implementations, analysis of the inducer fan may be performed during a time window prior to the circulator blower beginning. The current drawn by the circulator blower may mask any current drawn by the inducer blower.

A fault in the fan pressure switch may be detected when the time-domain current indicates that the furnace restarted but blower fault does not appear to be present and ignition retries were not performed. In other words, the furnace may be operating as expected with the issue that the fan pressure switch does not recognize that the blower motor is not operating correctly. Service may be called to replace the fan pressure switch. In various implementations, the fan pressure switch may fail gradually, and therefore an increase in the number of furnace restarts attributed to the fan pressure switch may indicate an impending fault with the fan pressure switch.

A flame probe fault is detected when a flame has been properly created, but the flame probe does not detect the flame. This is determined when there are ignition retries but frequency-domain data indicates that the igniter appears to be operating properly. Frequency-domain data may also indicate that the gas valve is functioning properly, isolating the fault to the flame probe. A fault in the gas valve may be detected based on the sequence of states in the furnace as indicated by the current. Although the amount of current drawn by the gas valve may be small, a signature corresponding to the gas valve may still be present in the frequency domain. When the signature is not present, and the furnace does not run, the absence of the signature may indicate a fault with the gas valve.

A coil, such as an evaporator coil, may freeze, such as when inadequate airflow fails to deliver enough heat to refrigerant in the coil. Detecting a freezing coil may rely on a combination of inputs, and depends on directional shifts in sensors including temperatures, voltage, time domain current, frequency domain current, power factor, and power measurements. In addition, voltage, current, frequency domain current, and power data may allow other faults to be ruled out.

A dirty filter may be detected in light of changes in power, current, and power factor coupled with a decrease in temperature split and reduced pressure. The power, current, and power factor may be dependent on motor type. When a mass airflow sensor is available, the mass flow sensor may be able to directly indicate a flow restriction in systems using a permanent split capacitor motor.

Faults with compressor capacitors, including run and start capacitors, may be determined based on variations in power factor of the condenser monitor module. A rapid change in power factor may indicate an inoperative capacitor while a gradual change indicates a degrading capacitor. Because capacitance varies with air pressure, outside air temperature may be used to normalize power factor and current data. A fault related to the circulator blower or inducer blower resulting from an imbalanced bearing or a blade striking the respective housing may be determined based on a variation in frequency domain current signature.

A general failure to cool may be assessed after 15 minutes from the call for cool. A difference between a supply air temperature and return air temperature indicates that little or no cooling is taking place on the supply air. A similar failure to cool determination may be made after 30 minutes. If the system is unable to cool by 15 minutes but is able to cool by 30 minutes, this may be an indication that operation of the cooling system is degrading and a fault may occur soon.

Low refrigerant charge may be determined when, after a call for cool, supply and return temperature measurements exhibit lack of cooling and a temperature differential between refrigerant in the suction line and outside temperature varies from a baseline by more than a threshold. In addition, low charge may be indicated by decreasing power consumed by the condenser unit. An overcharge condition of the refrigerant can be determined when, after a call for cool, a difference between liquid line temperature and outside air temperature is smaller than expected. A difference between refrigerant temperature in the liquid line and outside temperature is low compared to a baseline when refrigerant is overcharged.

Low indoor airflow may be assessed when a call for cool and fan is present, and the differential between return and supply air increases above a baseline, suction line decreases below a baseline, pressure increases, and indoor current deviates from a baseline established according to the motor type. Low outdoor airflow through the condenser is determined when a call for cool is present, and a differential between refrigerant temperature in the liquid line and outside ambient temperature increases above a baseline and outdoor current also increases above a baseline.

A possible flow restriction is detected when the return/supply air temperature split and the liquid line temperature is low while a call for cool is present. An outdoor run capacitor fault may be declared when, while a call for cool is present, power factor decreases rapidly. A general increase in power fault may be declared when a call for cool is present and power increases above a baseline. The baseline may be normalized according to outside air temperature and may be established during initial runs of the system, and/or may be specified by a manufacturer. A general fault corresponding to a decrease in capacity may be declared when a call for cool is present and the return/supply air temperature split, air pressure, and indoor current indicate a decrease in capacity.

In a heat pump system, a general failure to heat fault may be declared after 15 minutes from when a call for heat occurred and the supply/return air temperature split is below a threshold. Similarly, a more severe fault is declared if the supply/return air temperature split is below the same or different threshold after 30 minutes. A low charge condition of the heat pump may be determined when a call for heat is present and a supply/return air temperature split indicates a lack of heating, a difference between supply air and liquid line temperatures is less than a baseline, and a difference between return air temperature and liquid line temperature is less than a baseline. A high charge condition of the heat pump may be determined when a call for heat is present, a difference between supply air temperature and liquid line temperature is high, a difference between a liquid line temperature and return air temperature is low, and outdoor power increases.

Low indoor airflow in a heat pump system, while a call for heat and fan are present, is detected when the supply/return air temperature split is high, pressure increases, and indoor current deviates from a baseline, where the baseline is based on motor type. Low outdoor airflow on a heat pump is detected when a call for heat is present, the supply/return air temperature split indicates a lack of heating as a function of outside air temperature, and outdoor power increases.

A flow restriction in a heat pump system is determined when a call for heat is present, supply/return air temperature split does not indicate heating is occurring, runtime is increasing, and a difference between supply air and liquid line temperature increases. A general increase in power consumption fault for heat pump system may indicate a loss of efficiency, and is detected when a call for heat is present and power increases above a baseline as a function of outside air temperature.

A capacity decrease in a heat pump system may be determined when a call for heat is present, a supply/return air temperature split indicates a lack of heating, and pressure split in indoor current indicate a decreased capacity. Outside air temperature affects capacity, and therefore the threshold to declare a low capacity fault is adjusted in response to outside air temperature.

A reversing valve fault is determined when a call for heat is present but supply/return air temperature split indicates that cooling is occurring. Similarly, a reversing valve fault is determined when a call for cool is present but supply/return air temperature split indicates that heating is occurring.

A defrost fault may be declared in response to outdoor current, voltage, power, and power factor data, and supply/return air temperature split, refrigerant supply line temperature, suction line temperature, and outside air temperature indicating that frost is occurring on the outdoor coil, and defrost has failed to activate. When a fault due to the reversing valve is ruled out, a general defrost fault may be declared.

Excessive compressor tripping in a heat pump system may be determined when a call for cool or heating is present, supply/return air temperature split lacks indication of the requested cooling or heating, and outdoor fan motor current rapidly decreases. A fault for compressor short cycling due to pressure limits being exceeded may be detected when a call for cool is present, supply/return air temperature split does not indicate cooling, and there is a rapid decrease in outdoor current and a short runtime. A compressor bearing fault may be declared when an FFT of outdoor current indicates changes in motor loading, support for this fault is provided by power factor measurement. A locked rotor of the compressor motor may be determined when excessive current is present at a time when the compressor is slow to start. A locked rotor is confirmed with power and power factor measurements.

Thermostat short cycling is identified when a call for cool is removed prior to a full cooling sequence being completed. For example, this may occur when a supply register is too close to the thermostat, and leads to the thermostat prematurely believing the house has reached a desired temperature.

When a call for heat and a call for cool are present at the same time, a fault with the thermostat or with the control signal wiring is present. When independent communication between a monitor module and a thermostat is possible, such as when a thermostat is Internet-enabled, thermostat commands can be compared to actual signals on control lines and discrepancies indicate faults in control signal wiring.

Returning back to FIG. 2A, in order for the monitoring system to determine which mode the HVAC system is operating in, each control signal between the thermostat 208 and the control module 112 may be monitored. Because the monitoring system of the present disclosure can be used in a retrofit environment, this may require connecting leads to each of the control lines. Making individual connections requires additional installation time and therefore expense. As the number of connections increase, the number of opportunities for a loose connection, and therefore erroneous readings, increase.

Further, because connecting leads may require removing and reattaching control lines from the control module, the loose connection may even affect normal operation of the HVAC system, such as the ability of the thermostat 208 to control certain aspects of the control module 112. Further, a location at which the control lines are accessible may be difficult for an installer to reach without removing other components of the HVAC system, which increases installation time and also increases the risk of introducing problems.

With multiple connections, even when the control lines are successfully connected, there is a risk that the connections will be misidentified—e.g., leading the monitoring system to believe that a call for cool has been made by the thermostat 208 when, in fact, a call for heat was instead made. Some HVAC systems may use those control lines in a non-standard way. Again, this may lead to misinterpretation of the control signals by the monitoring system. A further complication is introduced by "communicating systems," which do not rely on standard HVAC control lines and instead multiplex multiple signals onto one or more control lines. For example only, in a communicating system the thermostat 208 and the control module 112 may perform bidirectional digital communication using two or more lines. As a result, individual control lines corresponding to each mode of operation of the HVAC system may not be present.

The present disclosure presents an alternative to individually sensing the control lines and this alternative may eliminate or mitigate some or all of the issues identified above. When the thermostat 208 makes a call for heat, one or more components of the HVAC system will draw a current to service the call for heat. For example, a relay (not shown) may be energized to open the gas valve 128. Meanwhile, when a call for cool is made by the thermostat 208, other components may draw a current—for example, a relay may control the control module 156.

The current consumed by these various devices may be different. For example, the current required to close a switch of the control module 156 may be greater than the current required to open the gas valve 128. An aggregate control line current may therefore uniquely indicate various modes of operation. In FIG. 2A, a current sensor 400 is shown associated with the control signals exchanged between the thermostat 208 and the control module 112. The current is received by the air handler monitor module 200.

In some HVAC systems, the difference in current between two different modes may not be distinguishable with sufficient accuracy. For these situations, additional sensing may be required. For example, a sensor may be connected to a specific control line to provide additional information so that the mode of operation can be disambiguated.

The remote monitoring system 304 may communicate with the customer device 324 directly through either notifications, such as text messages, emails, social networking messages, voicemails, phone calls, etc. (as previously described), or through a monitoring client 336 installed on the customer device 324. The monitoring client 336 may be an app or other program on the customer device 324. The monitoring client 336 may communicate directly with the customer portal 332 and may provide real time, or current, updates on the system function and whether the system is installed or repaired properly. The customer device 324 may be an end-user's device, a technician's device, a utility company's device, or a contractor's device 320. When the monitoring client 336 is installed on the contractor device 320 and/or the utility company device, the monitoring client 336 may be an app or other program on the contractor device 320 and/or the utility company device. The term "real time" in this context generally requires that the delay between the user making a request for information and the results being returned is on the order of milliseconds or seconds, not tens of seconds, minutes, or hours. In other words, "real time" means that the results are acquired directly in response to the request as quickly as possible and promptly displayed to the user. Further, the "real time" information reflects the system behavior at the time that the request for information was made. The request for information may be made when the user accesses the monitoring client 336, opens the app or program, clicks a button within the monitoring client 336 that triggers a request for information, etc.

In these respects, "real time" system information differs from previously stored system information that may be obtained or stored during the time of failure, during the time of installation, during the time of a system reset by the technician, etc. In other words, "real time" system information is obtained from the monitoring client 336 (in communication with the customer portal 332) immediately following, and directly responsive to, a request for information from the user who is expecting a prompt response to the query.

The monitoring client 336 provides on-site validation of proper installation or repair of HVAC systems. The monitoring client 336 may be installed on an HVAC technician's device, an end-use customer's device, a contractor's device, or a utility company's computer system. The monitoring client 336 provides information that documents and communicates the quality of a new HVAC installation and/or repair to onsite technicians, contractor offices, and end customers. The interface with HVAC technicians provides a new tool to assist with automated data retrieval and analysis of performance data to assure proper installation or repair. The hardware remains installed upon the equipment to provide ongoing monitoring of the system to assure proper installation when temperatures change. This is especially important to validate Air Conditioning installations performed below 68 degrees Fahrenheit.

The monitoring client 336 serves the needs of on-site technicians by checking to make sure monitoring and diagnostics devices are installed properly. The monitoring client 336 is an interface that gives the technician real time feedback that the new HVAC system is installed and repaired properly—wiring is correct, components are operating properly, airflow is correct, split temperature is correct, refrigerant charge is correct, fan speed is correct, etc. The monitoring client 336 further displays and updates information in real time based on current operation of the HVAC system and instructs the onsite technician if there are issues, what the issues are, and if they have been corrected.

The monitoring client 336 serves the needs of contractors or contracting groups (such as "big box" stores) by providing installation information for quality installation and repair of heating and air conditioning systems. These organizations can use this information to identify areas of improvements, inefficacies, and quality issues. Also, this allows these customers to give their customers the highest quality experience possible. Managers at a contracting organization are able to see the performance and quality of work of individual technicians. Contractors are able to reduce future call back by identifying system issues that technicians may not have caught.

The monitoring client 336 serves end-use customers by providing communications that indicate a quality installation and/or repair of the HVAC system. The monitoring client 336 reports, outputs, and displays detailed information on different components of the HVAC system and whether each component has been installed or repaired correctly. If the system requires additional work, the monitoring client 336 will indicate to the homeowner, contractor, and/or technician exactly what needs to be corrected.

The monitoring client 336 serves utility companies (or energy conglomerators) with communications that indicate a quality installation and/or repair to ensure HVAC systems are running at peak efficiency. Additionally, ongoing monitoring assures that systems are maintained properly in order to keep the system running at its peak efficiency.

Common problems occurring during installation may be refrigerant loop problems, incorrect fan speeds, and wiring issues. By detecting these problems at the time of installation, call-backs for repair may be reduced by approximately 40% or more. The ability to verify the installation of hardware and the system operation at installation may lead to an increase in problem-free installations and a reduction in call backs by 50% or more. Common problems detected over time may be refrigerant loop leaks and degradation in equipment performance. By detecting these problems at the time they occur, and by detecting the cause of the problems, call backs for re-repair may be reduced by approximately 10% or more. The monitoring client 336 provides a third-party verification to the installation and repair process (in addition to the technician verification) that instils additional confidence in the end-user that the product has been correctly installed, in the technician that the installation or repair job is completed, and in the contractor that customer satisfaction will be high and there will unlikely be a callback. Further, the monitoring client 336 increases productivity for contractors and technicians by allowing contractors to match the correct technician to the job, send the technician with the right skills for the work, create training opportunities, free up peak capacity (predictive alerts allow contractors to pull work to off-peak months), shorten service calls (the diagnostics have been completed by the monitoring client 336), and have the right parts on the truck (creates a single trip and shorter repair time).

The monitoring client 336 assists customers in predicting breakdowns and system damage. In test cases, approximately 51.5% of customers received equipment alerts within the first year. In the test cases, approximately 20% of alerts occurred after system breakdown. During these alerts, an immediate alert was sent to the customer and contractor that included the cause for the breakdown and a recommendation for repair. In the test cases, over 80% of the alerts were sent before breakdown of the system. During these alerts, a proactive alert was sent to the customer and contractor that included the cause for the alert and the recommendation for repair.

An example of a test case where the alert was sent before breakdown of the system occurred on a system that was less than three (3) years old. The heating system had been verified on-site, using the monitoring client 336, during installation. On the day that the cooling system turned on for the first time in the season, the monitoring client 336 detected a low refrigerant charge/flow restriction. An alert was sent to the customer and service provider (contractor). The service provider dispatched a technician who checked the cooling system and found a slow refrigerant leak. The technician had arrived with the correct skill set and tools for a refrigerant charge/flow restriction repair (from the alert that was sent) and repaired the cooling system in a single trip with no comfort loss to the end-customer.

The monitoring client 336 may display various types of information to the user to convey the system health and operation. For example, the monitoring client 336 may display both general information and component and subsystem information. The general information may include whether the filter needs to be cleaned or replaced, the heating efficiency (heating output vs. power or gas consumed), and the cooling efficiency (cooling output vs. power consumed). The component and subsystem information may include functionality of components related to the air handler or furnace, such as the flame sensor, hot surface ignitors, blower motor and run capacitor, expansion device, capacitors, inducer motor, pressure switch, control lines (from T-Stat), electric heat sequencer, indoor coil effectiveness, and thermal limits. The component and subsystem information may also include functionality of components related to the condensing unit, such as the run and start capacitors (compressors), contactor, restricted air flow, refrigerant charge, refrigerant filter and dryer, compressor, condensing fan motor and capacitors, heat pump expansion device, reversing valve relay, refrigerant charge compensator, outdoor coil effectiveness, and defrost board.

Figure 4B:
FIGS. 4A-4B are sample screen shots of outputs of a monitoring client on a customer device.
Figure 4A:

The monitoring client 336 may display the installation verification of the sensors in the system, such as the return air temperature sensor 224, the supply air temperature sensor 232, the liquid line temperature sensor 244, the suction line temperature sensor 240, the indoor condensate temperature sensor 220, an outdoor condensate temperature sensor, and any other sensor connected to the system. As illustrated in FIGS. 4A and 4B, the verification of the installation of the sensors in the system may be indicated by a designated symbol. For example, if the sensor is connected and installed, an empty circle may be displayed adjacent to the sensor name. If the installation cannot be verified or if the sensor is disconnected, a circle with one line may be displayed adjacent to the sensor name (FIG. 4A). If a circle with one line is displayed adjacent to the sensor name, once the sensor is installed or connected, the circle with one line will be replaced by an empty circle, indicating that the sensor is connected and installed (FIG. 4B). While the use of designated symbols to indicate verification of the installation of the sensors in the system is illustrated and described, it is understood that any indicator may be used; for example, different colored symbols (i.e., green and yellow circles), different emoticons, colored bars, words or any other symbol could be used to indicate the connected/disconnected status (for another example, see FIG. 9).

The monitoring client may also display a split temperature status, a system status, or other operational status of the furnace or the heating system. As illustrated in FIGS. 5A and 5B, the status of the system functionality of the furnace may be indicated by a designated symbol. For example, if the furnace is operating efficiently without problem, an empty circle may be displayed adjacent to the "split temperature status" and "system status" names (FIG. 5B). If the functionality is compromised, such as by a low split temperature, a circle with an "X" may be displayed adjacent to the "split temperature status" and "system status" names (FIG. 5A). The circle with an X is displayed adjacent to the "split temperature status" name because the failure returned is a low split temperature. The circle with X is displayed adjacent to the "system status" name because the low split temperature causes a failure of the entire furnace system. If a circle with an X is displayed adjacent to the "split temperature status" and/or "system status" names, once the failure is remedied, the circle with an X will be replaced by an empty circle, as shown in FIG. 5B, indicating that the furnace system is operating properly. While the use of designated symbols to indicate system functionality of the furnace is illustrated and described, it is understood that any indicator may be used; for example, different colored symbols (i.e., green, yellow, and red circles), different emoticons, colored bars, words, or any other symbol could be used to indicate the status of the system functionality of the furnace (for another example, see FIG. 9).

The monitoring client may also display a low charge, a low outdoor airflow, a blower speed setting too high, a low indoor airflow, an overcharge, a system status, or other operational status of the cooling system. As illustrated in FIGS. 6A and 6B, the status of the system functionality of the cooling system may be indicated by a designated symbol. For example, if the cooling system is operating efficiently without problem, an empty circle may be displayed adjacent to the a low charge, low outdoor airflow, blower speed setting too high, low indoor airflow, overcharge, and system status names. If the functionality is compromised, such as when the blower speed setting is too high, a circle with an "X" may be displayed adjacent to the "blower speed setting too high" and "system status" names (FIG. 6A). The circle with an X is displayed adjacent to the "blower speed setting too high" name because the failure returned is a blower speed setting that is set too high. The circle with an X is displayed adjacent to the "system status" name because the blower speed setting being too high causes a failure of the entire cooling system. If a circle with an X is displayed adjacent to the "blower speed setting too high" and "system status" names, once the failure is remedied, the circle with an X will be replaced by an empty circle indicating that the cooling system is operating properly.

In another example, if the functionality is compromised, such as by a low indoor air flow, a circle with an X may be displayed adjacent to the "low indoor airflow" and "system status" names (FIG. 6B). The circle with an X is displayed adjacent to the "low indoor airflow" name because the failure returned is a low indoor airflow. The circle with an X is displayed adjacent to the "system status" name because the low indoor airflow causes a failure of the entire cooling system. If a circle with an X is displayed adjacent to the "low indoor airflow" and "system status" names, once the failure is remedied, the circle with an X will be replaced by an empty circle indicating that the cooling system is operating properly. While the use of designated symbols to indicate system functionality of the cooling system is illustrated and described, it is understood that any indicator may be used; for example, different colored symbols (i.e., green, yellow, and red circles), different emoticons, colored bars, words, or any other symbol could be used to indicate the status of the system functionality of the cooling system (for another example, see FIG. 9).

Figure 7:
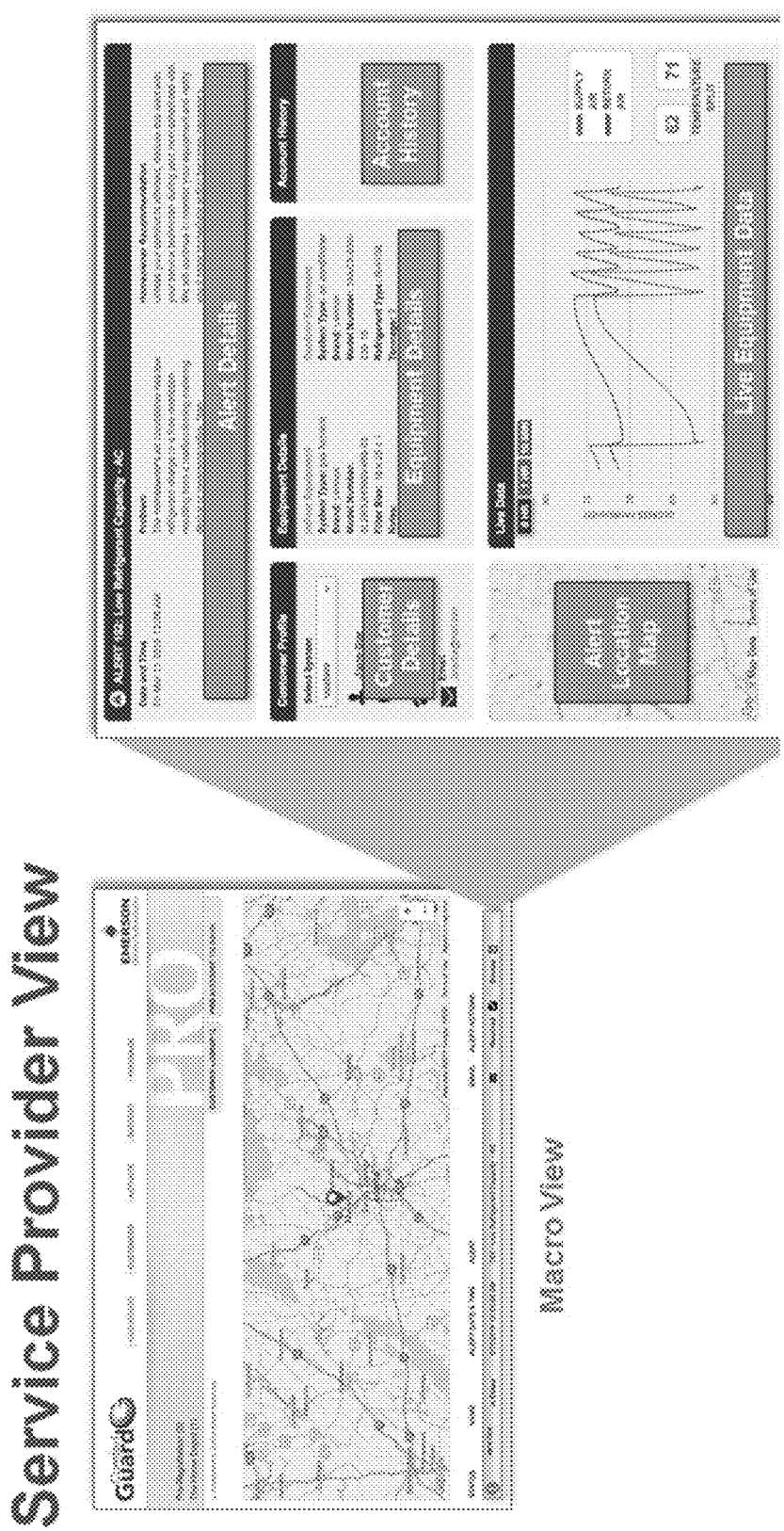
FIG. 7 is a sample screen shot for an output of a monitoring client on a contractor's device.

The monitoring client 336 may be set up to provide the service provider or contractor with a first set of information, the end-use customer with a second set of information, and the technician with a third set of information to fit each user's individual needs. For example, the monitoring client 336 installed on the contractor's device may provide the contractor with the location of the particular system along with alert details, customer details, equipment details, account history, and live, or real-time, equipment data, as shown in FIG. 7.

The monitoring client 336 installed on the end-use customer's device may provide alert details such as the problem stated in layman's terms, a recommendation for fixing the problem, contact information for the end-user's service professional, the alert date and time, the area served by the system, and a reference number, as shown in FIG. 8A. The monitoring client 336 installed on the end-use customer's device may also provide a monthly system report to the customer (FIG. 8B). In the monthly system report, the monitoring client 336 may display test results for power consumption, airflow, refrigerant, and components monthly diagnostic tests, along with an overall heating and/or cooling efficiency score.

Figure 9:
FIG. 9 is a sample of screen shots for an output of a monitoring client on a technician's device.

As shown in FIG. 9, the monitoring client 336 installed on the technician's device may provide the technician with installation information to highlight installation issues and/or confirm a problem free installation. Specifically, the monitoring client 336 may display a status for components of the equipment for each of the system installation, fan, heating system, and cooling system. For example, during a cooling system check, the monitoring client 336 may highlight issues or confirm operation of the cooling control line, split temperature, charge, outdoor air flow, indoor air flow, blower speed setting (stage 1), blower speed setting (stage 2), and current sensor (outdoor). Once each issue is remedied, the monitoring client 336 may confirm passage of the system check for the cooling system.

Figure 10:
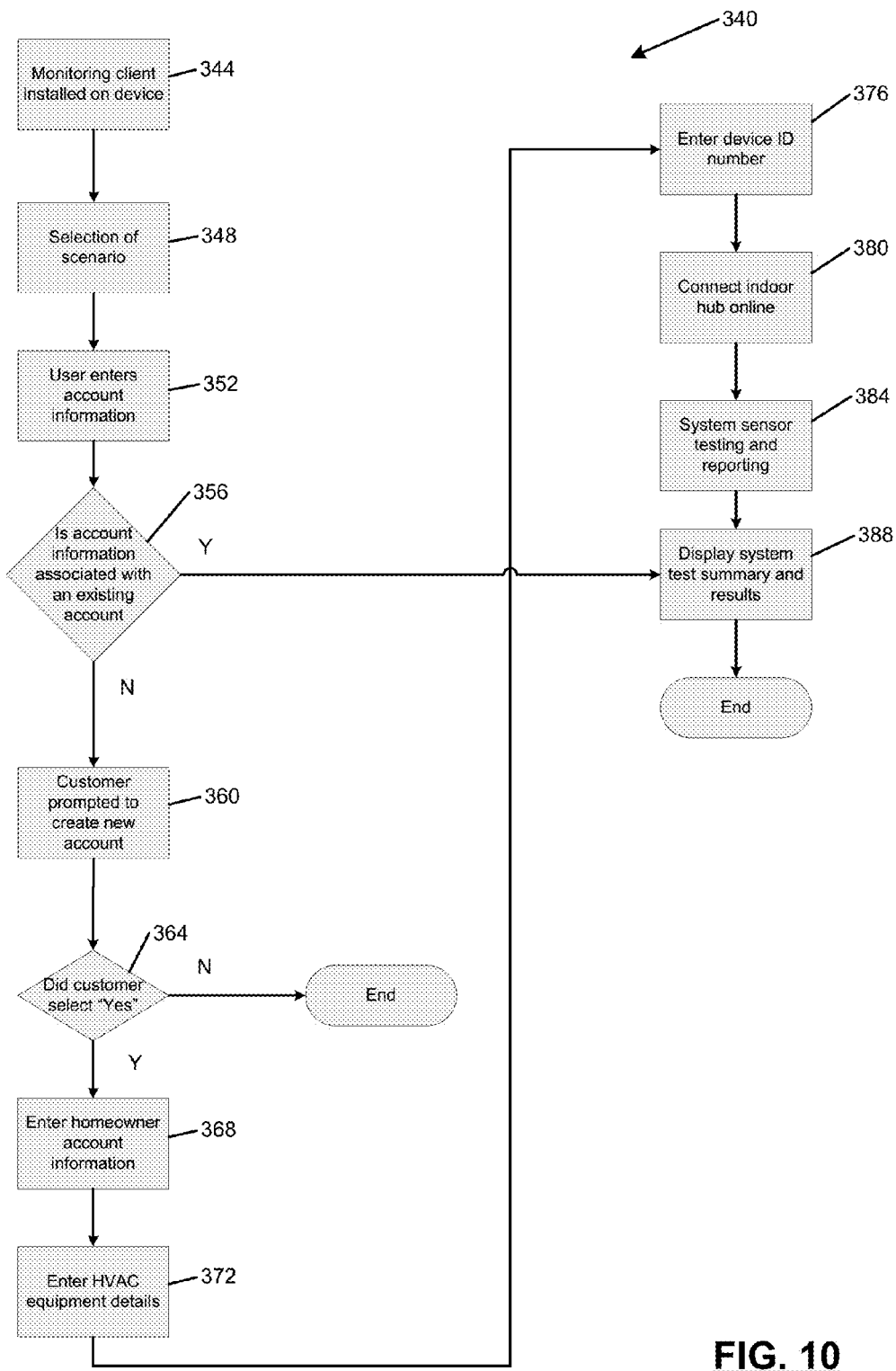
FIG. 10 is a flow chart for a method of verifying installation of an HVAC system using a monitoring client.
Figures 11, 12, 13:
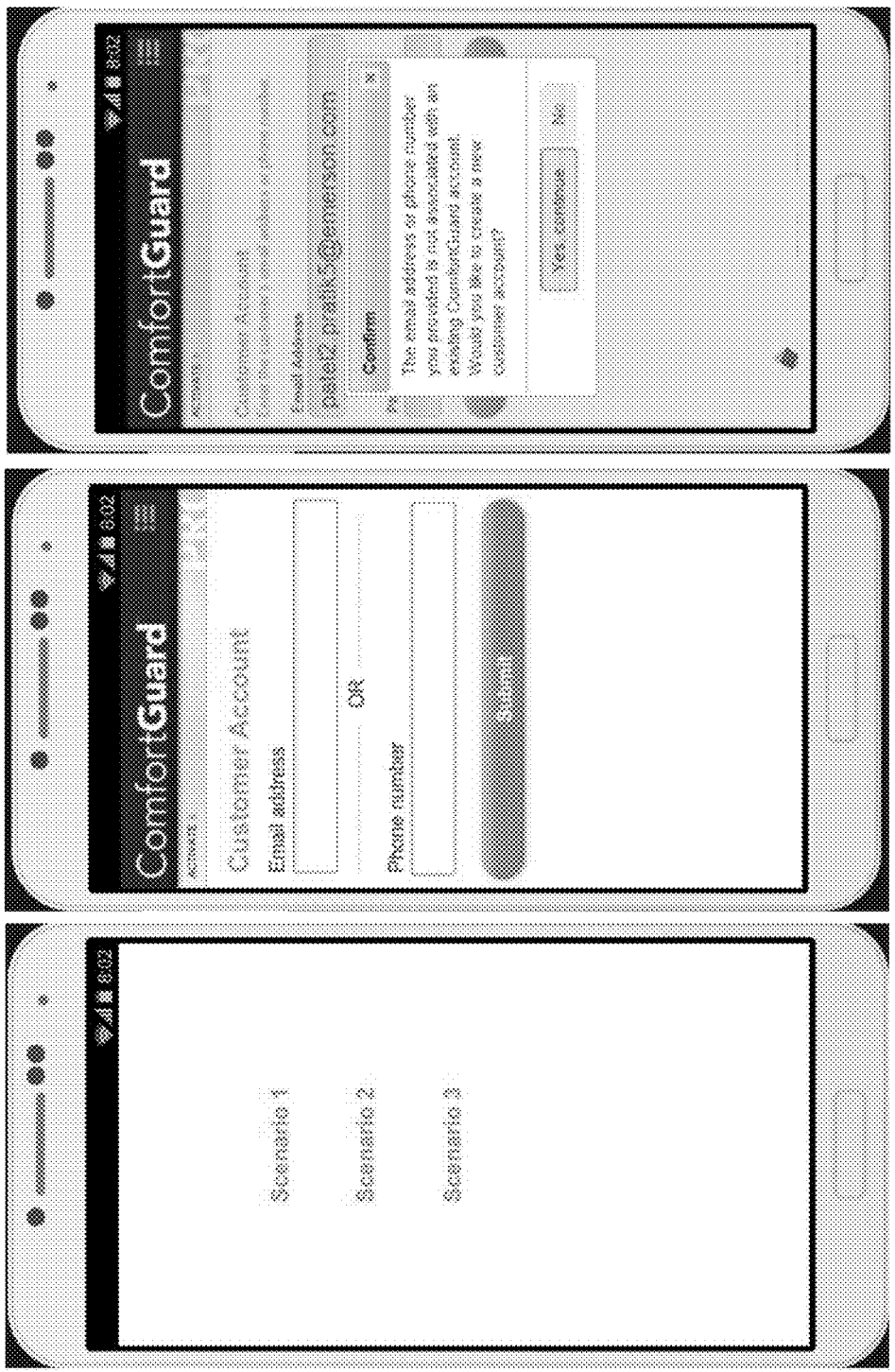
FIG. 11 is a sample screen shot for verifying installation of an HVAC system using a monitoring client.
FIG. 12 is another sample screen shot for setting up an account on a monitoring client.
FIG. 13 is another sample screen shot for setting up an account on a monitoring client.

A method 340 for installing and using the monitoring client 336 is illustrated in FIG. 10. The monitoring client 336 is installed on the customer device by downloading the app or installing software on a computing device at step 344. As illustrated in FIG. 11, the monitoring client 336 may provide several different scenarios. For example, the monitoring client 336 may offer a scenario for an end-use customer device, a scenario for a technician device, a scenario for a contractor device, a scenario for a utility company device, a scenario for an installation, a scenario for a monthly diagnostic report, a scenario for a system check, or any other scenario. At 348 (FIG. 10) the user may select a scenario. Although this step is included, it is not necessary for the monitoring client 336 to include a variety of scenarios or require selection of a scenario. The scenario may be automatically selected or implemented by the device based on information about the user and/or the anticipated use of the monitoring client 336. For example, the user may select whether the user is an end-use customer, an HVAC technician or contractor, a utility company, etc. and/or whether the monitoring client 336 will be used for an installation, monthly diagnostic reports, system checks, etc.

In FIGS. 10 and 12, the customer may be prompted to enter account information, such as an email address or phone number, and select "submit," at step 352. At step 356, the monitoring client 336 determines whether the account information is associated with an existing account. If the account information is not associated with an account, in step 360 (FIG. 10), the customer may be prompted to create a new account. As step 364, if the customer selects "No," the method 340 ends. If the customer selects "Yes," at step 368 the customer is prompted to create a new homeowner account by entering the following information: first name, last name, homeowner email, confirmation of homeowner email, phone number, address of system installation, city of system installation, state of system installation, zip code of system installation, homeowner street address, homeowner city, homeowner state, homeowner zip code, payment information including billing type, and creation of a system name that is identified by the area served by the system (FIGS. 10, 14A-14C). After inputting the information, the customer selects "save and continue."

Figure 15A:
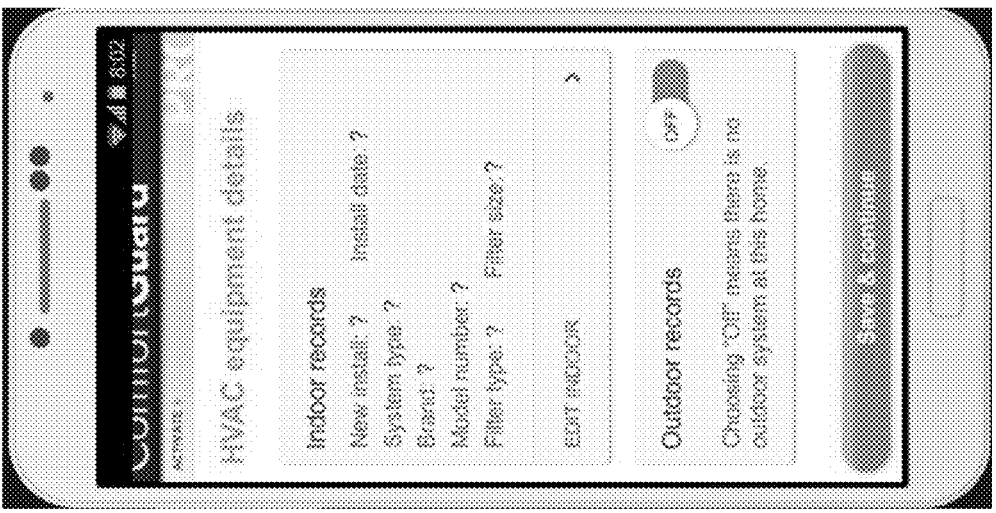
Figure 15B:
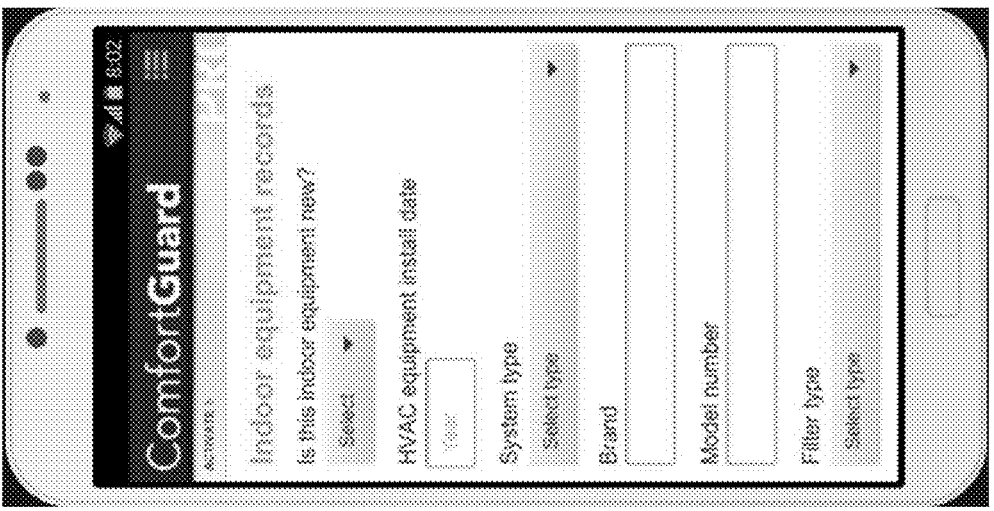
Figure 15C:
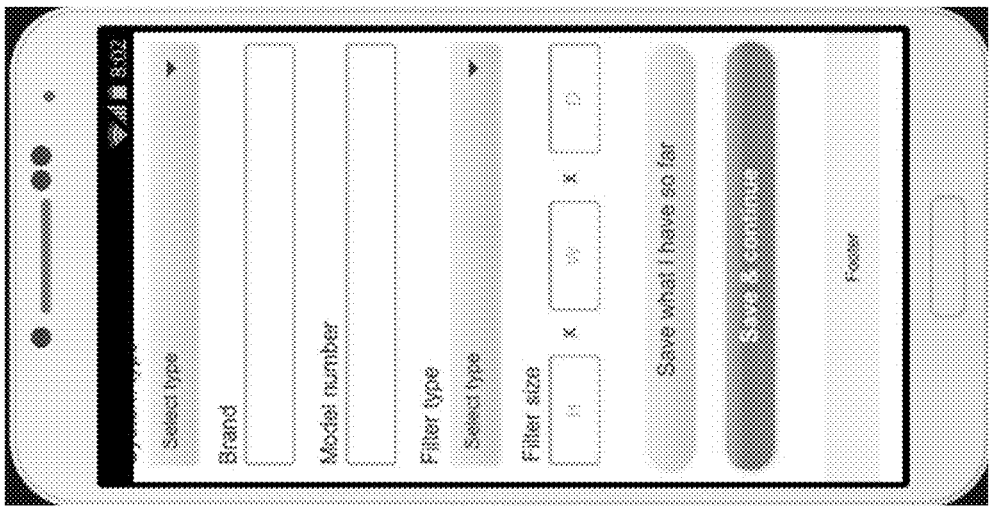
Figures 15D, 15E, 15F:
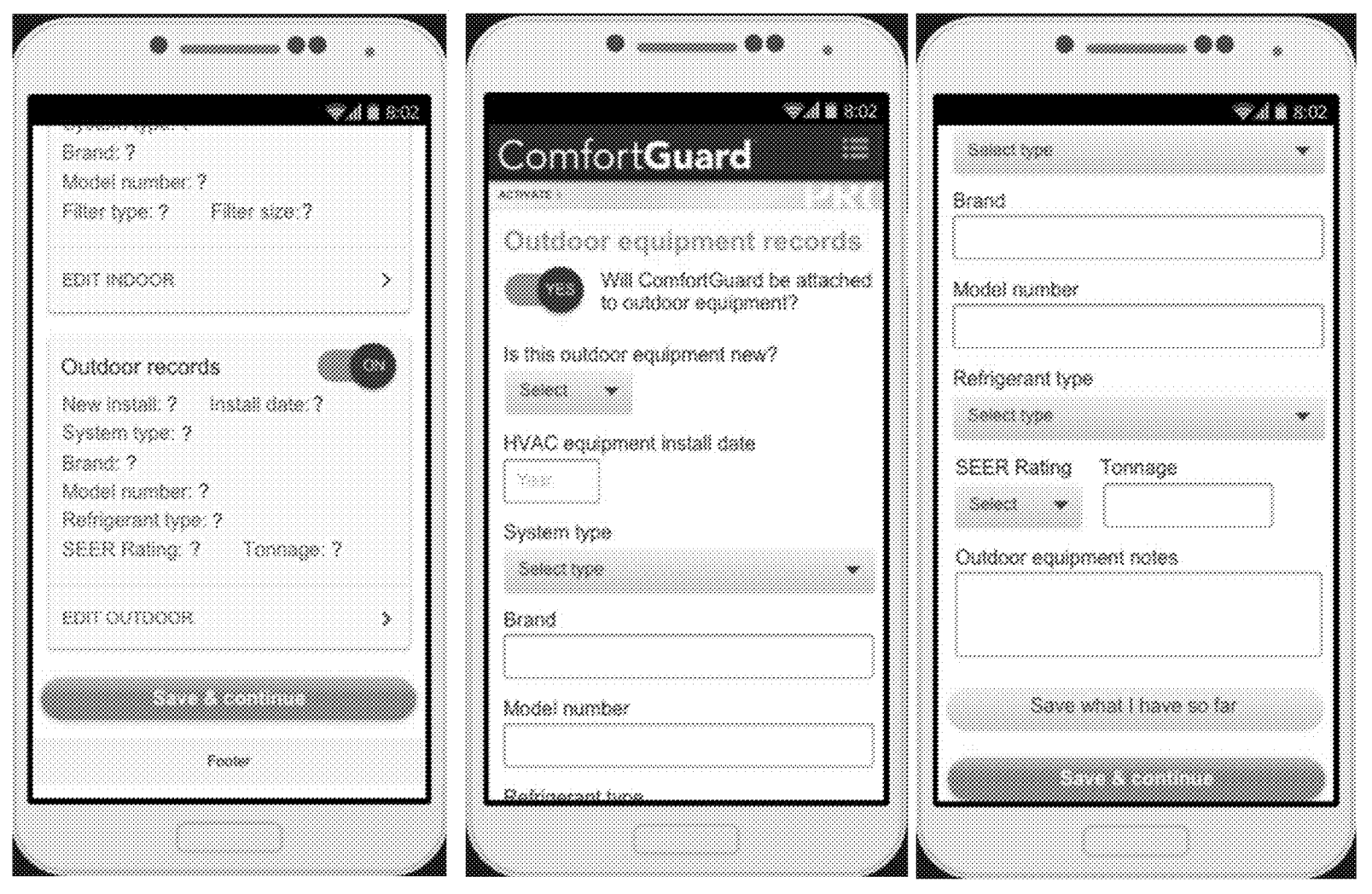

At step 372, the user enters various HVAC equipment details (FIGS. 10, 15A-15F). The user may select "edit indoor" to change the indoor records, such as whether it is a new installation, the installation date, the system type, the brand, the model number, the filter type, and the filter size (FIGS. 15B-15C). The user may further slide the outdoor records button from "OFF" to "ON" and select "edit outdoor" to change the outdoor records, such as whether it is a new installation, the installation date, the system type, the brand, the model number, the refrigerant type, the SEER rating and the tonnage (FIGS. 15D-15F).

Figures 16, 17A, 17B:
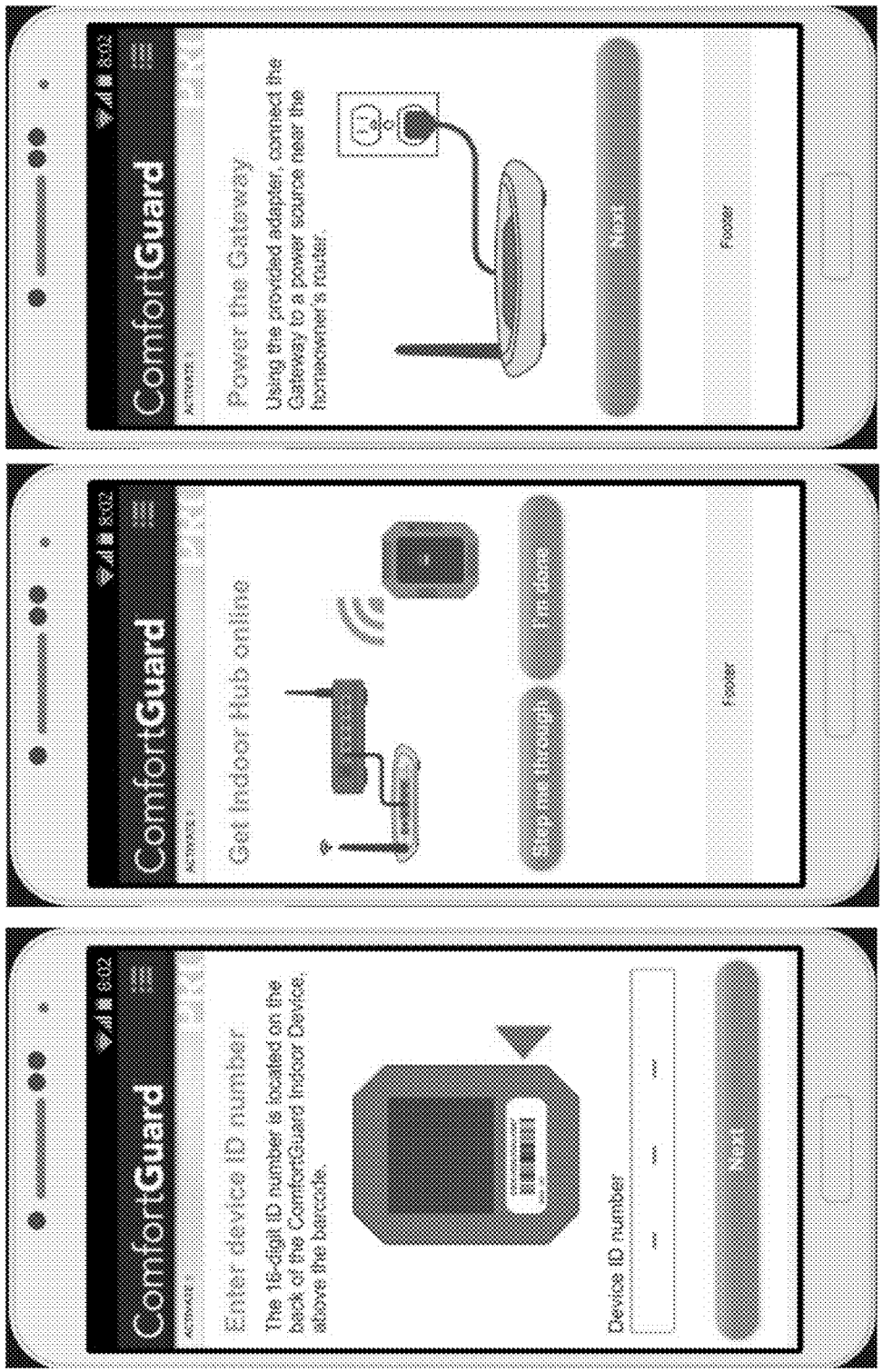

At step 376, the user is prompted to enter the device ID number (FIGS. 10 and 16). The device ID number may be a 16-digit number located on the indoor device, for example, on the back, above a barcode. Once the 16-digit device ID is entered, the user may click "next."

Figure 17H:
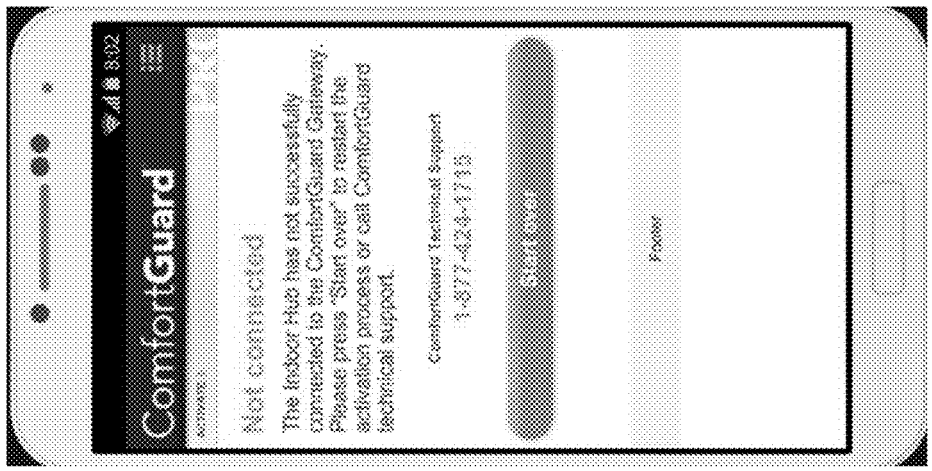
Figure 17G:
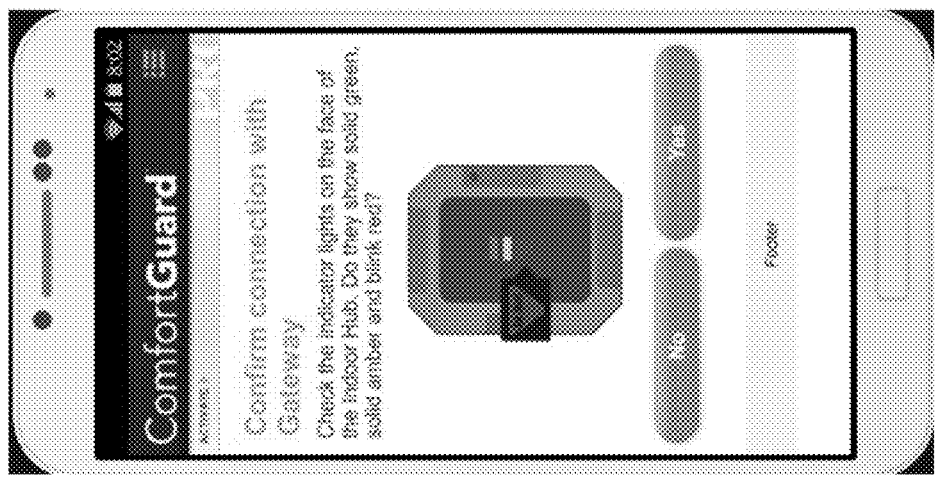
Figure 17F:
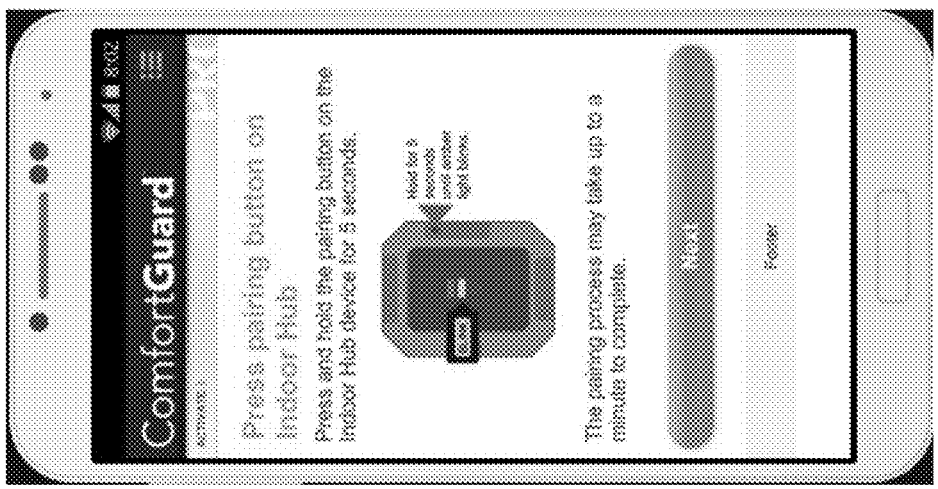
Figure 17K:
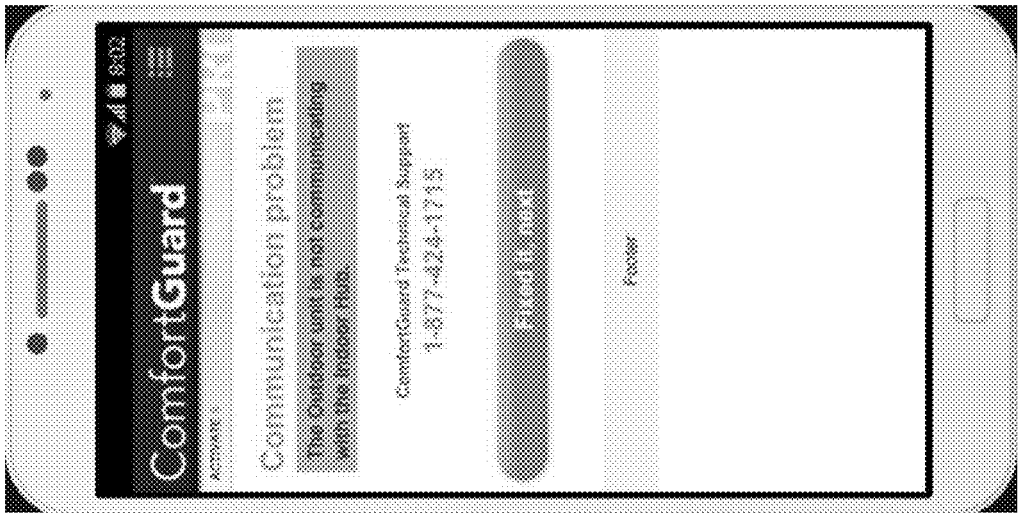
Figure 17J:
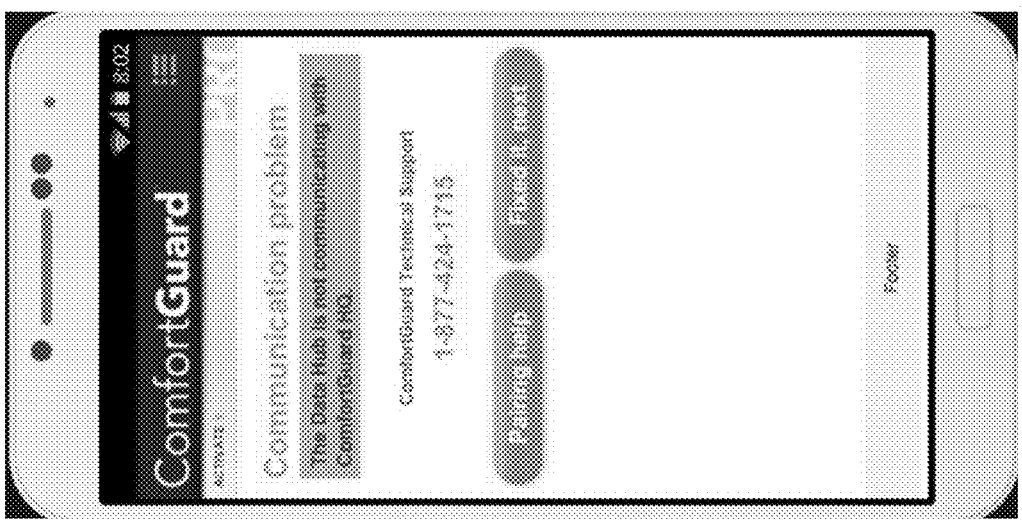
Figure 17I:
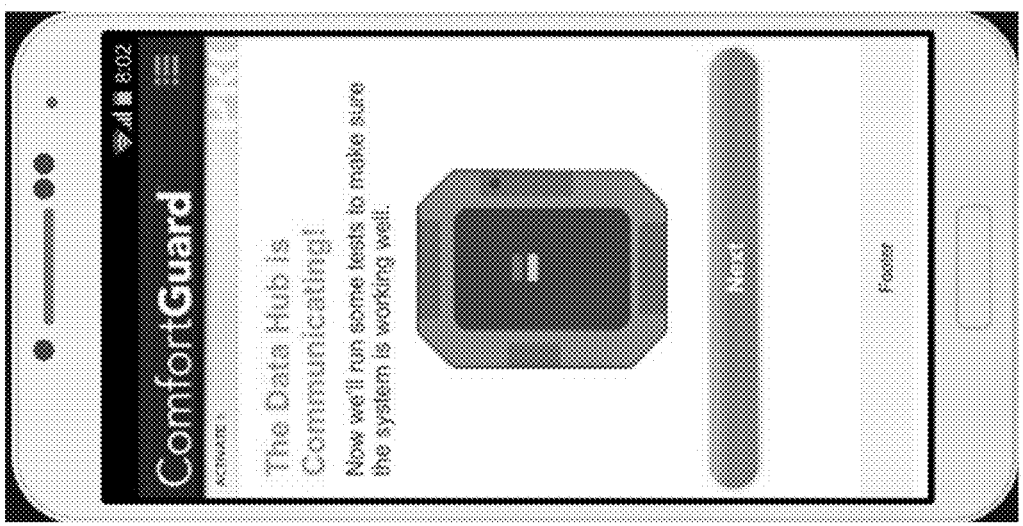

At step 380, the user is prompted to connect the indoor hub online (FIGS. 10, 17A-17M). The user has the option of the monitoring client 336 stepping the user through the process or selecting "I'm done" (FIG. 17A). If the user selects "Step me through," the monitoring client 336 instructs the user to power the gateway 256 by connecting the adapter to a power source near the homeowner's router 252 (FIG. 17B). The user is then prompted to connect the gateway 256 to the router 252 (FIG. 17C). The network cable may be connected at one end to a yellow port on the gateway 256 and at the other end to any open port on the router 252. When the gateway 256 is connected to the router 252, the user can check the gateway 256 signal strength (FIG. 17D). The user may then press the QSS pairing button on the gateway 256 (FIG. 17E) and press the pairing button on the indoor hub (FIG. 17F). The pairing button on the indoor hub must be pressed within two minutes of pressing the pairing button on the gateway 256. The user may then confirm the connection between the indoor hub and the gateway 256 (FIG. 17G). If the indoor hub is not connected to the gateway 256, the monitoring client 336 instructs the user to call technical support and provides appropriate contact information (FIG. 17H). If the indoor hub is connected to the gateway 256, the monitoring client 336 instructs the user that the data hub is communicating and to stand by for some system tests (FIG. 17I). Had, in FIG. 17A, the user selected "I'm done," the monitoring client 336 would have skipped to FIG. 17I to confirm that the indoor hub is connected to the gateway 256.

If the data hub is having issues communicating, the monitoring client 336 may display a variety of error messages to assist in diagnosing the issue. For example, the monitoring client 336 may display a message that the data hub is not communicating with the contractor or service provider headquarters (FIG. 17J). If the user selects "pairing help," the monitoring client 336 will step through the process shown in FIGS. 17C-17I. If the user selects "fixed it, next," the monitoring client 336 will re-run the test to confirm that the indoor hub is connected to the gateway 256 (FIG. 17I). The monitoring client 336 may also display a message that the outdoor unit is not communicating with the indoor hub (FIG. 17K). The monitoring client 336 may also display contact information for technical support to assist the user in troubleshooting this failure.

Figure 17M:
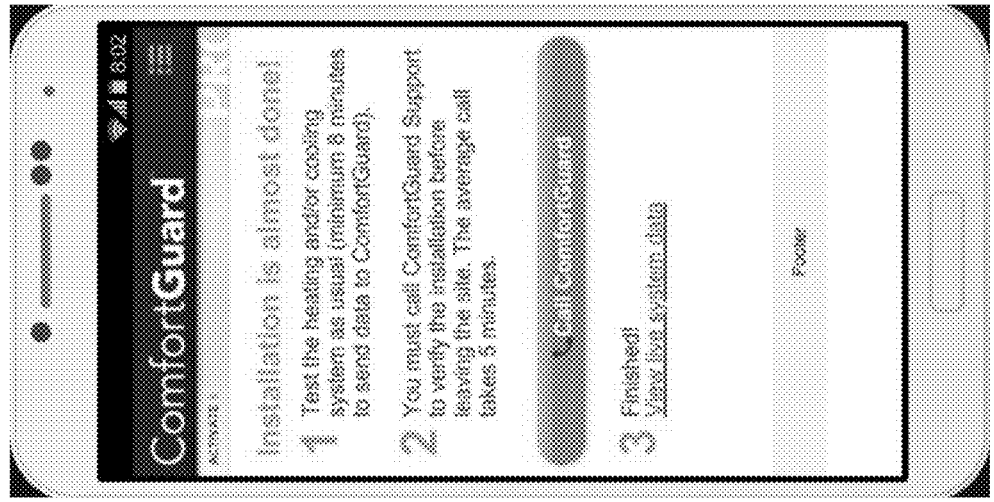
Figure 17L:
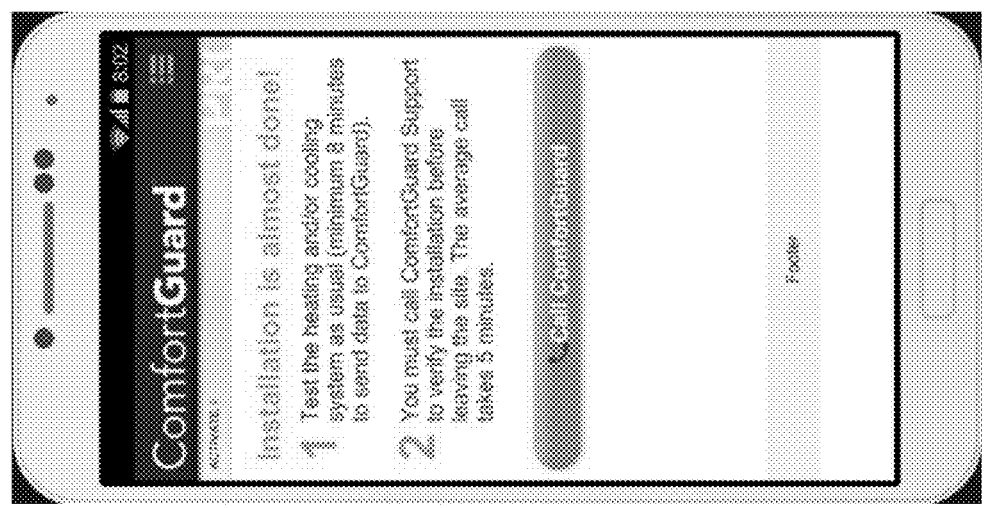

After establishing the appropriate connections, the monitoring client 336 may prompt the user to contact the service provider, contractor, or company headquarters to verify installation and to test the heating and/or cooling system (FIGS. 17L, 17M).

Figure 18B:
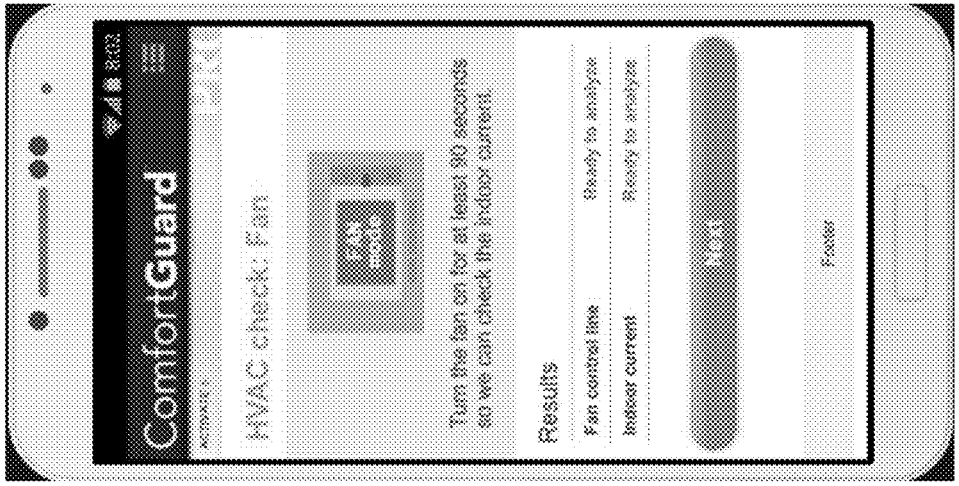
FIGS. 18A-18G are sample screen shots for executing validation testing of an HVAC system using a monitoring client.
Figure 18A:
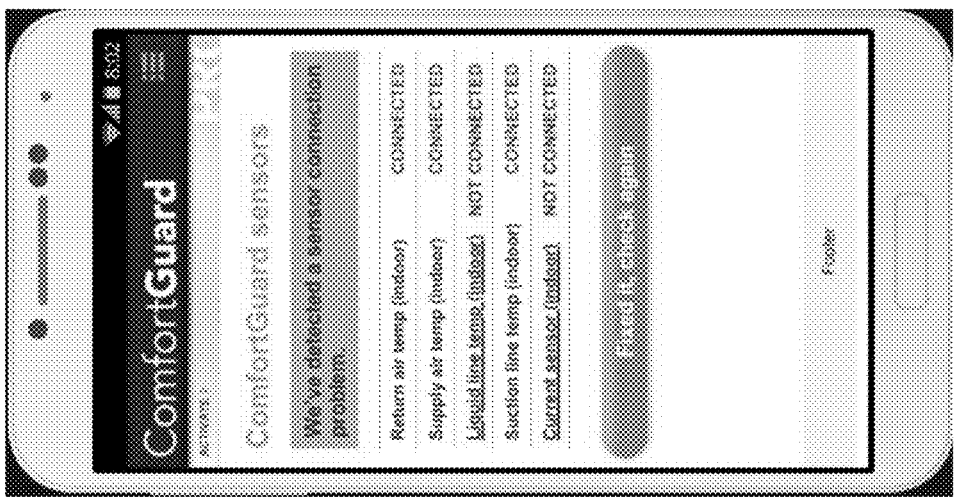

At step 384, the monitoring client 336 prompts system sensor testing and displays the results (FIGS. 10, 18A). During the sensor testing, the monitoring client 336 may display that one or more sensors are connected and one or more sensors are disconnected. If the monitoring client 336 is installed on an installer's device, when one or more sensors are disconnected, the installer is prompted to fix the disconnected sensor(s) and check the sensor testing again. If the monitoring client 336 is installed on an end-user device, the end-user may be prompted to contact the contractor or installer to fix the sensors.

Figures 18C, 18D, 18E:
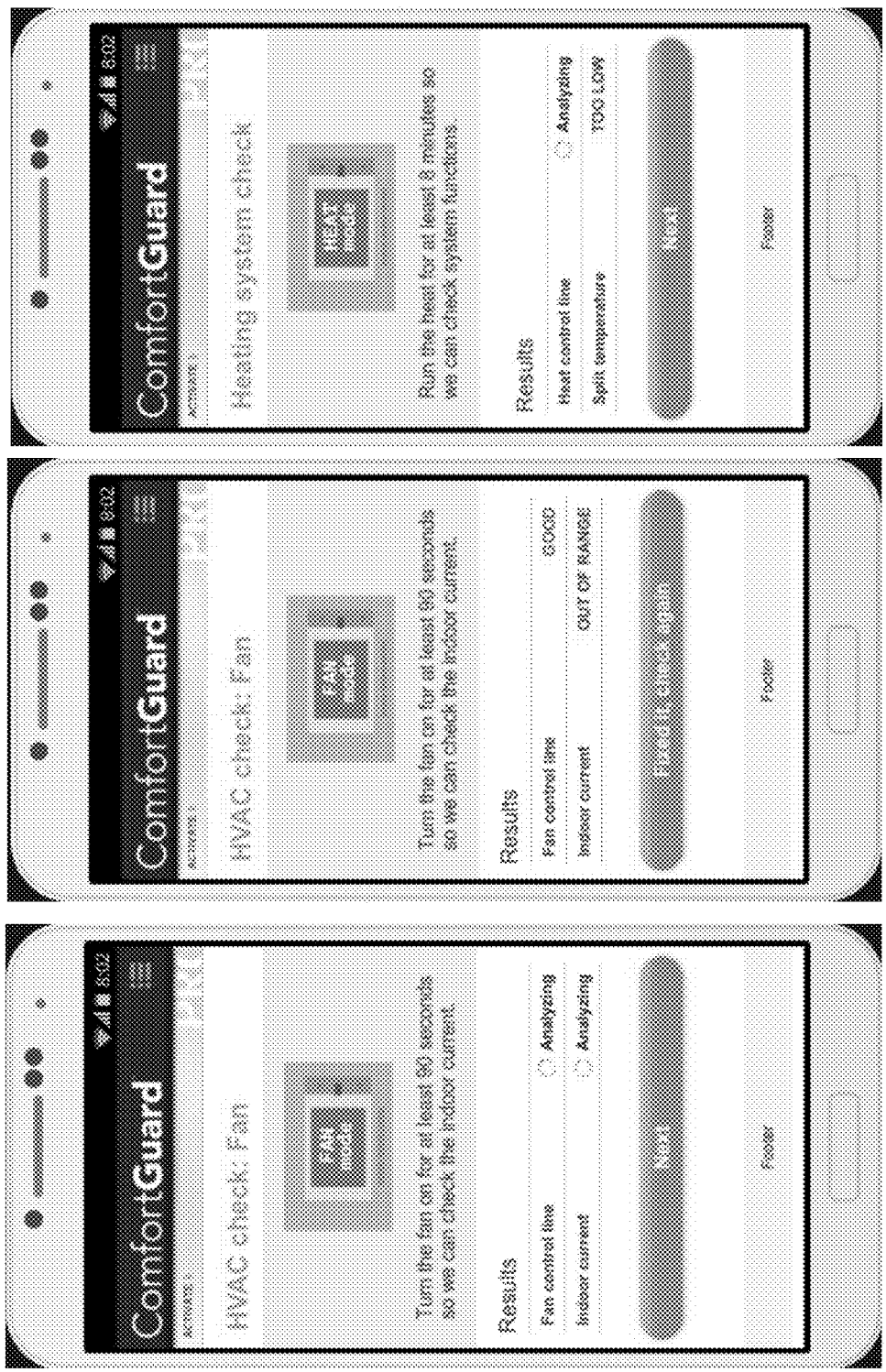

Once the user has repaired any unconnected sensors, the user may click "fixed it, check again" to prompt the monitoring client 336 to re-run the sensor test. Once all sensors display "connected," the monitoring client 336 moves to the next testing, such as HVAC check: Fan (FIG. 18B). The monitoring client 336 instructs the user to turn the fan on for at least 90 seconds such that the validation testing may be completed. Once the user runs the fan for 90 seconds, "Next" may be selected. As the fan validation testing is completing, the monitoring client 336 may display an "analyzing" symbol, such as a word or image, next to each test to be completed ("fan control line" and "indoor current") (FIG. 18C). Once completed, the test results are displayed adjacent to each test (FIG. 18D). One or more of the test results may be good and one or more of the test results may fail. The status of the test may be indicated by symbol, word, and/or color. For example, a positive test result may be indicated by the word "good" written in green. A negative test result may be indicated by the issue, for example "out of range," or the word "fail" written in red. Once the user fixes the identified issues, the user may select "fixed it, check again" to re-run the fan validation tests. Once all validation tests indicate a positive result, "next" is selected, and the monitoring client 336 moves to the next system test, such as the heating system check (FIG. 18E).

The user is prompted to run the heat for at least 8 minutes while the system function is tested. During testing, the monitoring client 336 may display an "analyzing" symbol, such as a word or image, next to each test to be completed ("heat control line" and "split temperature") (FIG. 18E). Once completed, the test results are displayed adjacent to each test. One or more of the test results may be good and one or more of the test results may fail. The status of the test may be indicated by symbol, word, and/or color. For example, a positive test result may be indicated by the word "good" written in green. A negative test result may be indicated by the issue, for example "too low," or the word "fail" written in red. Once the user fixes the identified issues, the user may select "fixed it, check again" to re-run the heating system check. Once all tests indicate a positive result, "next" is selected, and the monitoring client 336 moves to the next system test, such as the partial cooling check (FIG. 18F).

Figure 18F:
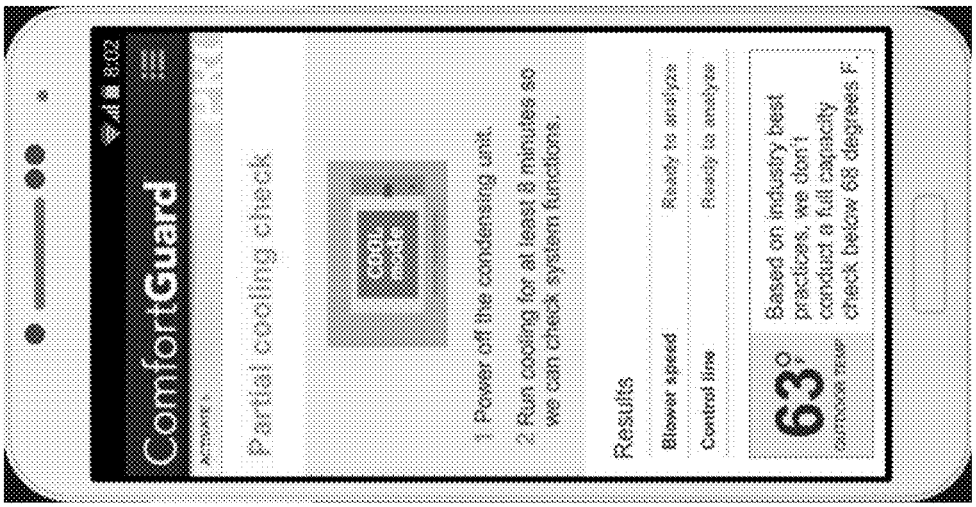

The user is prompted to power off the condensing unit and run the cooling for at least 8 minutes while the system function is tested (FIG. 18F). During testing, the monitoring client 336 may display an "analyzing" symbol, such as a word or image, next to each test to be completed ("blower speed" and "control line"). Once completed, the test results are displayed adjacent to each test. One or more of the test results may be good and one or more of the test results may fail. The status of the test may be indicated by symbol, word, and/or color. For example, a positive test result may be indicated by the word "good" written in green. A negative test result may be indicated by the issue or the word "fail" written in red. Once the user fixes the identified issues, the user may select "fixed it, check again" to re-run the partial cooling system check. Once all tests indicate a positive result, "next" is selected, and the monitoring client 336 moves to the next system test.

Figure 18G:
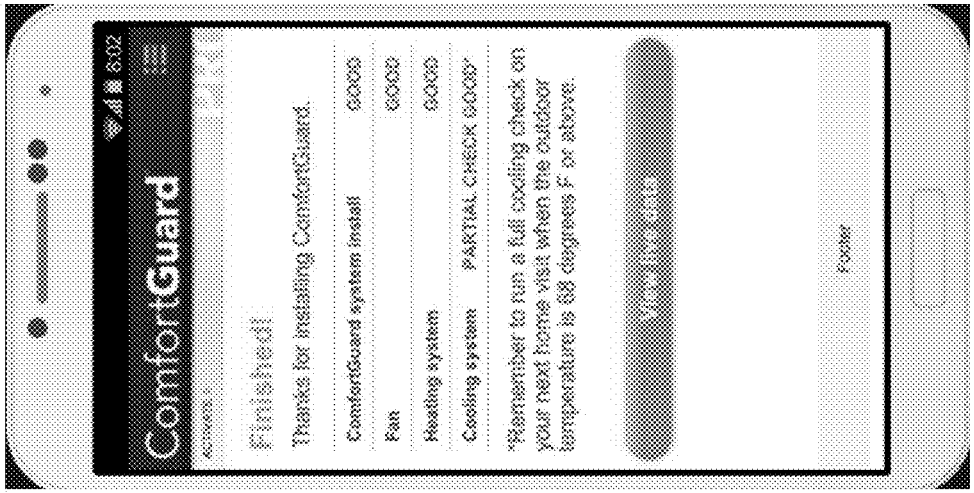

Once all system tests are complete, at step 388 the monitoring client 336 displays a summary of the tests performed and the current, real-time, result of all tests (FIG. 18G). The user may click "view live data" to update each of the test results. After step 388, the method 340 ends.

Figure 19:
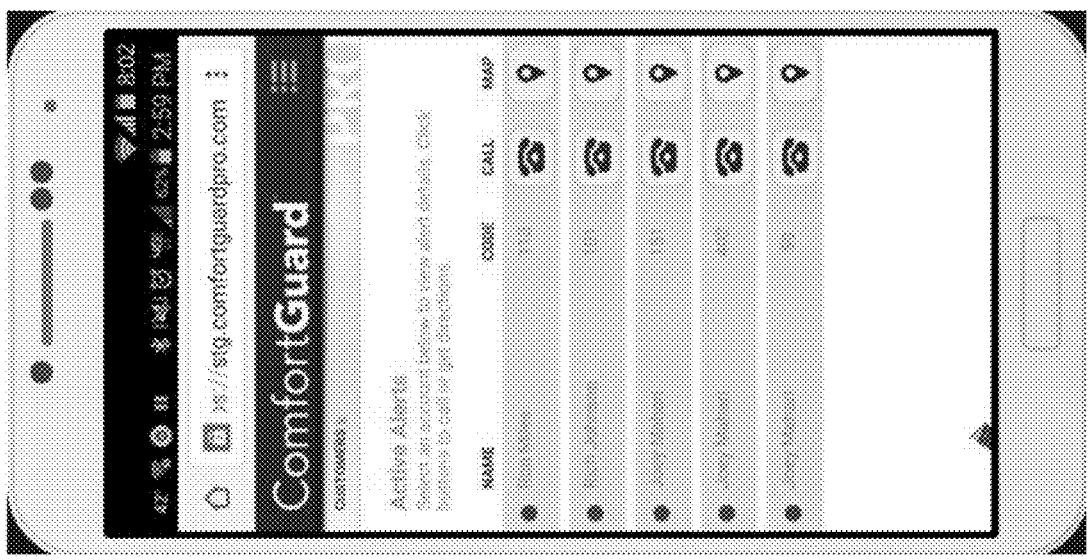
FIG. 19 is a sample screen shot of an active alerts screen on a monitoring client.

As illustrated in FIG. 19, a user may monitor active alerts through the monitoring client 336. For example, a technician may monitor active alerts for a defined service perimeter, or the technician may monitor active alerts for a group of customers assigned to him. Also, a contractor or service provider may monitor active alerts for a defined customer location or location parameter (for example, a district or zone for which the contractor or service provider manages). To monitor active alerts, the monitoring client 336 may display the customer name, the failure code, a link to the customer phone number, and a link to a map with the customer location.

Figure 20:
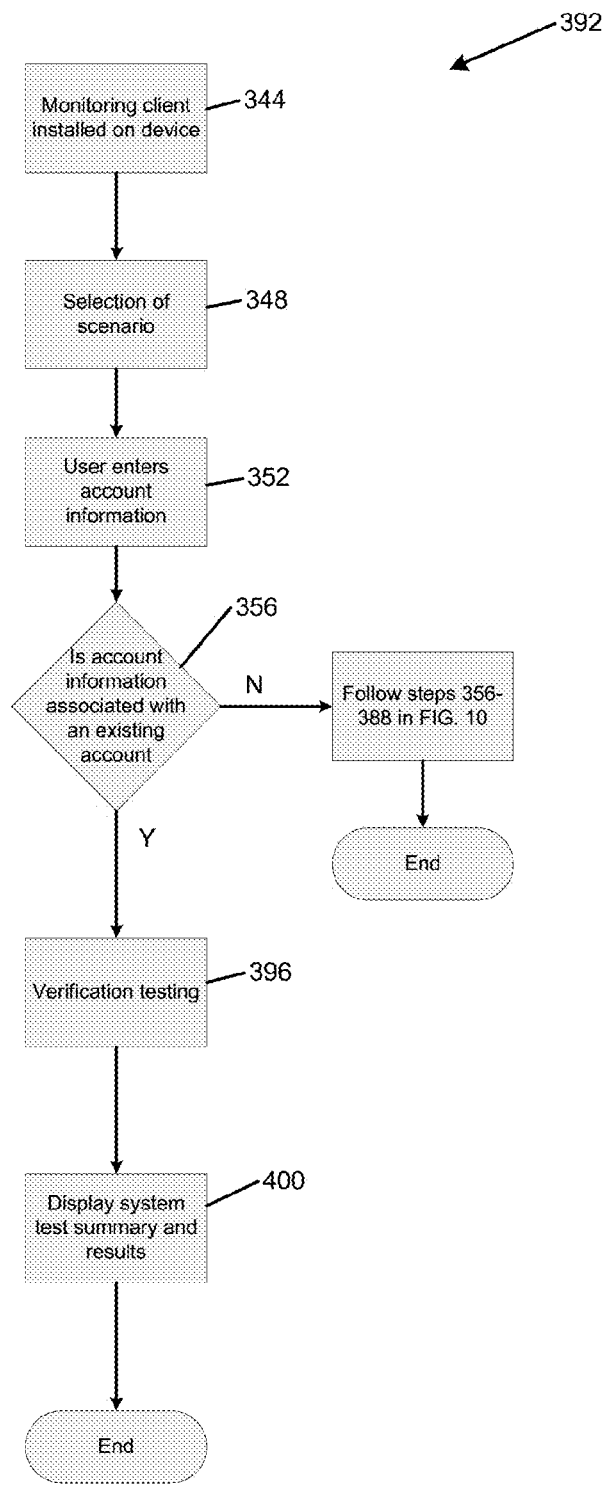
FIG. 20 is a flow chart for a method of monitoring an HVAC system using a monitoring client.

A method 392 for another scenario is illustrated in FIG. 20. After the system is installed and initially verified (FIG. 10), a user may periodically monitor the system to ensure that it is running properly and efficiently. To monitor the system, the user may enter the account information, as previously done. Since the system has been installed, it is likely that the account will be an existing account. If the account is not an existing account, the user will follow steps 356-388 as previously described with respect to FIG. 10.

If the account is an existing account, at step 396 the monitoring client 336 will prompt the system to run verification testing as previously discussed with respect to FIGS.

Figure 21A:
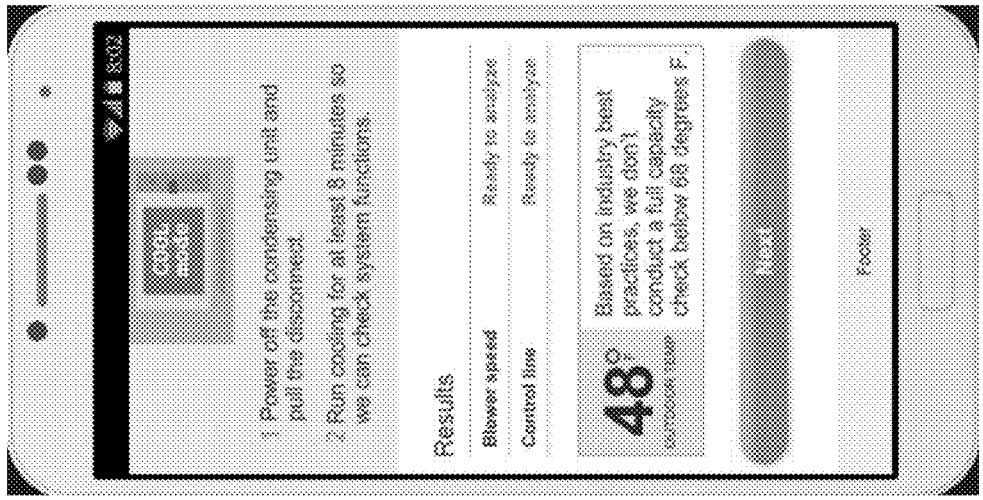
FIGS. 21A-21B are sample screen shots for executing a partial cooling system check using a monitoring client.
Figure 21B:
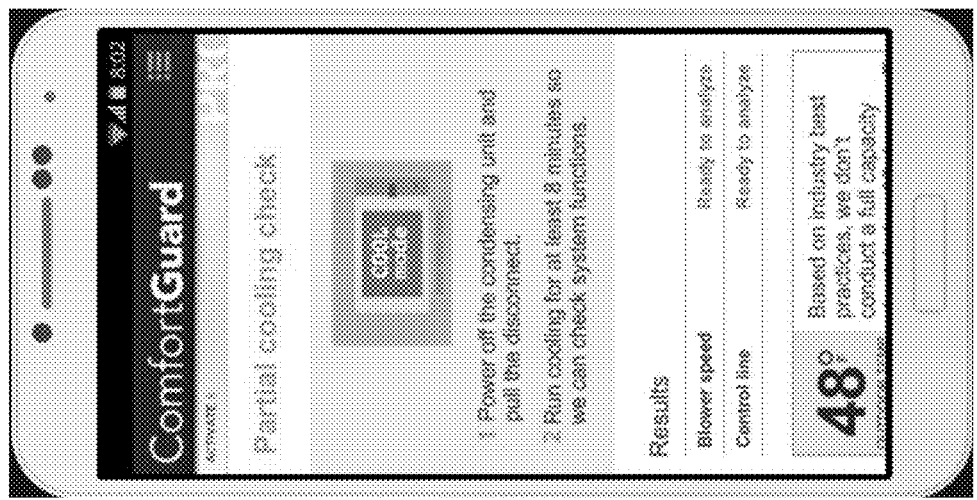

18A-18G. For each test, for example, sensors, fan, heating system, and cooling system, the monitoring client displays instructions for completing the test and test summary data. For example, with respect to the cooling system, if the temperature is less than a predetermined threshold (for example only, the threshold may be between approximately 48° F. and 63° F.) a partial cooling check is performed based on industry best practices (FIGS. 21A-21B). The user will follow the steps as detailed on the monitoring client 336, and the monitoring client will display the results of the testing adjacent to each test performed (for example, "blower speed" and "control line").

Figure 22B:
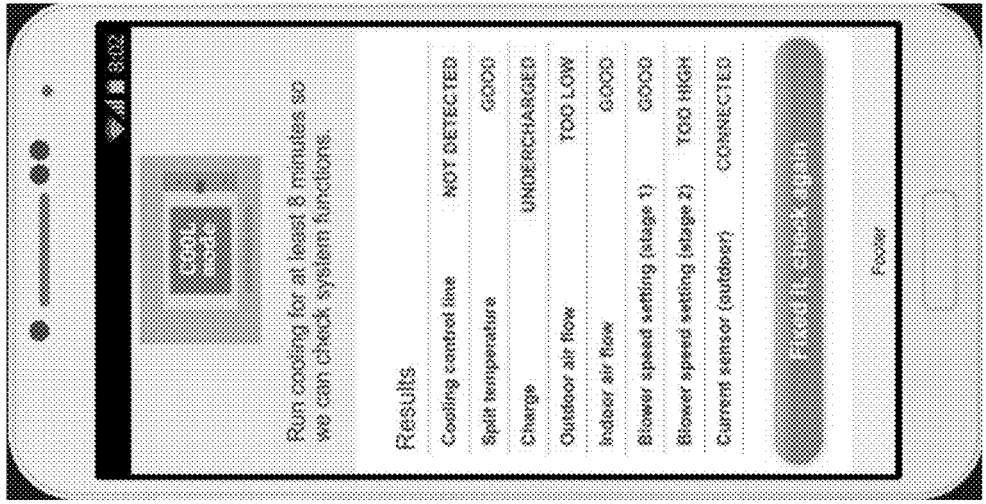
FIGS. 22A-22B are sample screen shots containing output data from a cooling system check using a monitoring client.
Figure 22A:
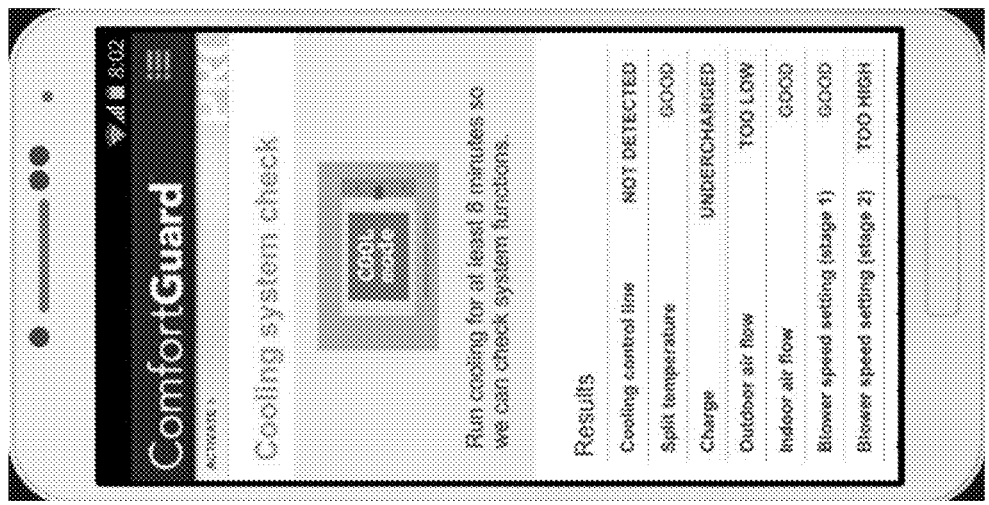

When the temperature is greater than the predetermined threshold, the monitoring client 336 will prompt a full cooling system check, and will conduct tests on additional components (FIGS. 22A-22B). For example, the monitoring client 336 will display test data for the cooling control line, the split temperature, the charge, the outdoor air flow, the indoor air flow, the blower speed setting (stage 1), the blower speed setting (stage 2), and the current sensor (outdoor). As previously discussed, one or more of the test results may be good and one or more of the test results may fail. The status of the test may be indicated by symbol, word, and/or color. For example, a positive test result may be indicated by the word "good" or "connected" written in green. A negative test result may be indicated by the issue, such as "not detected," "undercharged," "too low," or "too high," or the word "fail" written in red. Once the user fixes the identified issues, the user may select "fixed it, check again" to re-run the cooling system check. Once all tests indicate a positive result, "next" is selected, and the monitoring client 336 moves to the next system test.

Once all system tests are complete, at step 400 the monitoring client 336 displays a summary of the tests performed and the current, real-time, result of all tests (similar to FIG. 18G). The user may click "view live data" to update each of the test results.

Once all system tests are complete, at step 388 the monitoring client 336 displays a summary of the tests performed and the current, real-time, result of all tests (FIG. 18G). The user may click "view live data" to update each of the test results. After step 388, the method 340 ends.

In addition, after all system tests and verification testing are complete, for example at step 388 of FIGS. 10 and at 396 and 400 of FIG. 20, the monitoring client 336 can receive and display instructions for performing corrective action to correct any issues noted during the verification testing. For example, as noted above, the testing may reveal that portions of the system, such as specific sensors or system components, have been installed incorrectly or the certain system settings or operational parameters have been set incorrectly. The remote monitoring system 304, including the monitoring server 308 and/or the review server 312, may store predetermined information with instructions for a user or installer to perform corrective action to address any issues noted during the verification testing. At step 388 of FIGS. 10 and 400 of FIG. 20, the displayed system test summary and results may include the previously stored predetermined information with instructions for a user or installer to perform the corrective action to address the noted issues during the verification testing. For example, if the verification testing reveals that a sensor or system component is installed incorrectly, the monitoring client 336 can receive and display step-by-step instructions for the user or installer to address the issue by, for example, re-installing the previously incorrectly installed sensor or system component. Additionally, if the verification testing reveals that a system setting or operational parameter has been set incorrectly, the monitoring client 336 can receive and display step-by-step instructions for the user or installer to address the issue by, for example, changing the particular system setting or operational parameter.

Further, the monitoring client 336 may also receive input from the user or installer to provide comments or explanations as the user or installer is attempting to follow the previously provided corrective actions. For example, the monitoring client 336 may receive text or voice recording input that is then communicated to the remote monitoring system 304, including the monitoring server 308 and/or review server 312 and stored with data associated with the particular user or system. For example, the monitoring client 336 may provide instructions to the user or installer to take corrective action and the user or installer may disagree with the provided corrective action and/or may be unable to comply with the provided corrective action. In such case, the user or installer can input comments and explanation regarding any special circumstances of the installation and the system. For example, the user or installer could input comments and explanation for why a certain sensor, component, setting, or parameter was installed or set in a particular manner. The comments and explanation can then be stored by the remote monitoring system 304, including the monitoring server 308 and/or the review server 312 as data associated with the particular installation or system. In this way, the comments and explanation can be retrieved and reviewed in the future by another user or another technician or installer to determine why the system was installed or setup in the manner it was installed or setup. Additionally or alternatively, a user, a system administration, another installer, and/or a supervisor can review the comments and explanation and provide further instruction to the installer or schedule a follow-up service visit to the system to further address any issues raised.

Additionally, after all system tests and verification testing are complete, for example at step 388 of FIGS. 10 and at 396 and 400 of FIG. 20, the monitoring client 336 can receive input requesting that data associated with the particular HVAC system be submitted to a certification service, for example, for certification. For example, once the particular HVAC system installation is complete and verified, a user or installer may use the monitoring client 336 to initiate a certification process. For example, the monitoring client 336 can receive the input initiating the certification process. The monitoring client 336 can then communicate to the remote monitoring system 304, including the monitoring server 308 and/or the review server 302 that a request for certification for the particular HVAC system has been received. The remote monitoring system 304 can then receive and collect applicable monitored data associated with the HVAC system and necessary for certification, including, for example, current, voltage, and/or power data of the HVAC system along with various temperatures and pressures of the HVAC system, as applicable. The collected data can then be transmitted to an energy certification entity, such as an energy certification service or agency. For example, the collected data can be transmitted by the remote monitoring system 304 to an energy certification service such as a service or agency that administers ENERGY STAR® certification. The collected data, for example, can be compiled in text or spreadsheet format and communicated via email or via a file sharing site of the applicable service or agency for review and analysis. If approved, the service or agency can issue the particular energy certification, such as, for example, the ENERGY STAR® certification. The approval can be communicated back to the remote monitoring system 304, which can then notify the monitoring client 336 of the approval.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MAT-LAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A remote monitoring system for monitoring a heating, ventilation, and air conditioning (HVAC) system of a building, the remote monitoring system comprising:
 a monitoring server configured to:
  receive an aggregate current value from a monitoring device, wherein the aggregate current value represents a total current flowing through the HVAC system,
  determine a commanded operating mode of the HVAC system in response to the aggregate current value, wherein operating modes of the HVAC system include at least one of an idle mode and an ON mode, and
  analyze a system condition of the HVAC system based on the determined commanded operating mode; and
 a monitoring client in communication with the monitoring server and providing a user interface with a user, the monitoring client configured to:
  remotely monitor the HVAC system,
  remotely automatically command the monitoring server to execute validation testing based on data received from remotely monitoring the HVAC system,
  display results of validation testing,
  display real-time system performance data,
  display an alert during a system malfunction, and
  automatically display step-by-step instructions for performing a corrective action on the HVAC system based on the results of the validation testing, the corrective action including at least one of uninstalling a sensor, uninstalling a system component, revising a system setting, installing a system component, installing a sensor, and repairing a system component.

2. The monitoring system of claim 1, wherein the corrective action includes at least one of re-installing a previously installed sensor, re-installing a previously installed system component, and revising a system setting.

3. The monitoring system of claim 1, wherein the monitoring client is further configured to receive user input including at least one of text input and voice recording input after displaying the instructions for performing the corrective action on the HVAC system.

4. The monitoring system of claim 1, wherein the monitoring client is further configured to receive user input including at least one of text input and voice recording input and to send the user input to the monitoring server for storage with data associated with the HVAC system.

5. The monitoring system of claim 1, wherein the monitoring client is further configured to receive user input for a request for energy certification and send a message to the monitoring server indicating the request for energy certification and wherein the monitoring server is configured to send data associated with the HVAC system to a third-party energy certification entity based on the command from the monitoring client.

6. The monitoring system of claim 5, wherein the data sent to the third-party energy certification entity includes power data associated with the HVAC system.

7. A method for remotely monitoring a heating, ventilation, and air conditioning (HVAC) system of a building, the method comprising:
 receiving, with a monitoring server, an aggregate current value from a monitoring device, wherein the aggregate current value represents a total current flowing through the HVAC system;
 determining, with the monitoring server, a commanded operating mode of the HVAC system in response to the aggregate current value, wherein operating modes of the HVAC system include at least one of an idle mode and an ON mode;
 analyzing, with the monitoring server, a system condition of the HVAC system based on the determined commanded operating mode;
 remotely monitoring, by a monitoring client, the HVAC system;
 remotely automatically commanding, by the monitoring client, the monitoring server to execute validation testing based on data received from remotely monitoring the HVAC system;
 sending to the monitoring client, with the monitoring server, results of validation testing for display on the monitoring client;
 sending to the monitoring client, with the monitoring server, real-time system performance data for display on the monitoring client;
 sending to the monitoring client, with the monitoring server, an alert during a system malfunction; and
 automatically sending to the monitoring client, with the monitoring server, step-by-step instructions for performing a corrective action on the HVAC system based on the results of the validation testing, the corrective action including at least one of uninstalling a sensor, uninstalling a system component, revising a system setting, installing a system component, installing a sensor, and repairing a system component.

8. The method of claim 7, wherein the corrective action includes at least one of re-installing a previously installed sensor, re-installing a previously installed system component, and revising a system setting.

9. The method of claim 7, further comprising receiving, with the monitoring server, user input from the monitoring client, the user input including at least one of text input and voice recording input.

10. The method of claim 7, further comprising receiving, with the monitoring server, a request for energy certification from the monitoring client and sending data associated with the HVAC system to a third-party energy certification entity.

11. The method of claim 10, wherein the data sent to the third-party energy certification entity includes power data associated with the HVAC system.

12. A non-transitory tangible computer readable medium storing instructions executable by a processor of a monitoring server, the instructions comprising:
 receiving an aggregate current value from a monitoring device, wherein the aggregate current value represents a total current flowing through a heating, ventilation, and air conditioning (HVAC) system;
 determining a commanded operating mode of the HVAC system in response to the aggregate current value, wherein operating modes of the HVAC system include at least one of an idle mode and an ON mode;

analyzing a system condition of the HVAC system based on the determined commanded operating mode;

automatically receiving from a remote monitoring client a command to execute validation testing based on data received from remote monitoring of the HVAC system by the remote motoring client;

sending to the monitoring client results of validation testing for display on the monitoring client;

sending to the monitoring client real-time system performance data for display on the monitoring client;

sending to the monitoring client an alert during a system malfunction; and automatically sending to the monitoring client, with the monitoring server, directions for performing a corrective action on the HVAC system based on the results of the validation testing, the corrective action including at least one of uninstalling a sensor, uninstalling a system component, revising a system setting, installing a system component, installing a sensor, and repairing a system component.

13. The non-transitory tangible computer readable medium of claim 12, wherein the corrective action includes at least one of re-installing a previously installed sensor, re-installing a previously installed system component, and revising a system setting.

14. The non-transitory tangible computer readable medium of claim 12, the instructions further comprising receiving, with the monitoring server, user input from the monitoring client, the user input including at least one of text input and voice recording input.

15. The non-transitory tangible computer readable medium of claim 12, the instructions further comprising receiving a request for energy certification from the monitoring client and sending data associated with the HVAC system to a third-party energy certification entity.

16. The non-transitory tangible computer readable medium of claim 15, wherein the data sent to the third-party energy certification entity includes power data associated with the HVAC system.

* * * * *